(12) United States Patent
Centonza

(10) Patent No.: US 11,576,136 B2
(45) Date of Patent: *Feb. 7, 2023

(54) ENABLING INTERFERENCE MITIGATION FOR OVER-THE-AIR SYNCHRONIZATION

(71) Applicant: Telefonaktiebolaget L M Ericsson (publ), Stockholm (SE)

(72) Inventor: Angelo Centonza, Winchester (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1881 days.

This patent is subject to a terminal disclaimer.

(21) Appl. No.: 14/832,205

(22) Filed: Aug. 21, 2015

(65) Prior Publication Data

US 2016/0057719 A1    Feb. 25, 2016

Related U.S. Application Data

(60) Provisional application No. 62/040,401, filed on Aug. 21, 2014.

(51) Int. Cl.
*H04L 7/08* (2006.01)
*H04W 56/00* (2009.01)
*H04B 7/26* (2006.01)

(52) U.S. Cl.
CPC ........ *H04W 56/003* (2013.01); *H04B 7/2687* (2013.01); *H04L 7/08* (2013.01); *H04W 56/0015* (2013.01)

(58) Field of Classification Search
CPC ........... H04W 56/003; H04W 56/0015; H04W 28/0236; H04W 72/082; H04W 6/0015; H04L 7/08; H04L 7/008; H04B 7/2687
See application file for complete search history.

(56) References Cited

U.S. PATENT DOCUMENTS 9,883,417 B2 * 1/2018 Soret ............... H04L 5/0032
2009/0225743 A1   9/2009 Nicholls et al.
(Continued)

FOREIGN PATENT DOCUMENTS

CN   102422669 A    4/2012
RU   2447617 C2    4/2012
(Continued)

OTHER PUBLICATIONS

3GPP TSG RAN 3 meeting# 84 R3-141214 (Year: 2014).*
(Continued)

*Primary Examiner* — Mohamed A Kamara
(74) *Attorney, Agent, or Firm* — Murphy, Bilak & Homiller, PLLC

(57) ABSTRACT

Techniques and apparatus for enabling and disabling of muting patterns in Radio Access Network (RAN) nodes for the purpose of allowing better detection and use of reference symbols used for over-the-air synchronization. An example method, in a base station operating in a wireless communications network, includes determining that a first neighbor cell of a plurality of neighbor cells is interfering with or is likely to interfere with a signal, from a second neighbor cell, that is used for synchronization. The method further includes sending, towards the first neighbor cell, a request for activation of a reference signal muting pattern by the first neighbor cell, the request including information identifying the second neighbor cell or a stratum of the second neighbor cell.

30 Claims, 13 Drawing Sheets

(56) References Cited

U.S. PATENT DOCUMENTS

| | | | |
|---|---|---|---|
| 2010/0278132 A1 | 11/2010 | Palanki et al. | |
| 2011/0300807 A1* | 12/2011 | Kwun | H04W 72/085 455/63.1 |
| 2012/0207043 A1* | 8/2012 | Geirhofer | H04L 5/0048 370/252 |
| 2013/0040673 A1* | 2/2013 | Siomina | H04W 56/0015 455/501 |
| 2013/0086214 A1* | 4/2013 | Jung | H04L 67/1095 709/217 |
| 2013/0322350 A1* | 12/2013 | Gaur | H04W 72/1231 370/329 |
| 2013/0343315 A1* | 12/2013 | Tiirola | H04W 72/1231 370/329 |
| 2014/0050184 A1* | 2/2014 | Yamazaki | H04L 5/0073 370/329 |
| 2015/0092582 A1* | 4/2015 | Liao | H04L 5/005 370/252 |
| 2015/0163760 A1 | 6/2015 | Wu et al. | |
| 2016/0006529 A1* | 1/2016 | Yl | H04L 5/0044 370/329 |
| 2016/0007310 A1* | 1/2016 | Yi | H04W 56/001 370/338 |
| 2016/0016536 A1* | 1/2016 | Merwald | B60S 1/606 701/36 |
| 2016/0165560 A1* | 6/2016 | Takeda | H04W 72/042 370/350 |
| 2016/0192304 A1* | 6/2016 | Yi | H04W 52/0206 370/328 |
| 2016/0211955 A1* | 7/2016 | Wu | H04W 24/02 |
| 2017/0026924 A1* | 1/2017 | Gou | H04W 72/0446 |
| 2017/0055237 A1* | 2/2017 | Byun | H04W 56/0015 |

FOREIGN PATENT DOCUMENTS

| | | | | |
|---|---|---|---|---|
| WO | WO-2013060931 A | * | 5/2013 | ........ H04W 72/1215 |
| WO | WO 2013060931 A1 | * | 5/2013 | ........ H04W 72/1215 |
| WO | 2014029112 A1 | | 2/2014 | |
| WO | WO-2016019515 A1 | * | 2/2016 | ............ H04W 56/00 |

OTHER PUBLICATIONS

Unknown, Author, "Discussion and way forward on Radio Interface Based Synchronisation", Ericsson, 3GPP TSG-RAN3 Meeting #84, R3-141906, Dresden, Germany, Aug. 18-22, 2014, 1-6.

Unknown, Author, "3GPP TS 36.413 V12.2.0", 3rd Generation Partnership Project; Technical Specification Group Radio Access Network; Evolved Universal Terrestrial Radio Access Network (E-UTRAN); S1 Application Protocol (S1AP) (Release 12)., Jun. 2014, pp. 1-285.

Unknown, Author, "3GPP TS 36.423 V12.0.0", 3rd Generation Partnership Project; Technical Specification Group Radio Access Network; Evolved Universal Terrestrial Radio Access Network (E-UTRAN); X2 application protocol (X2AP) (Release 12), Dec. 2013, pp. 1-143.

Unknown, Author, "Discussion on How to Support RIBS", 3GPP TSG-RAN3 Meeting #84, R3-141214, Seoul, Korea, May 19-23, 2014, pp. 1-6.

Unknown, Author, "LS on Radio Interface based Synchronization", 3GPP TSG RAN WG1 Meeting #77, R1-142762, Seoul, Korea, May 19-23, 2014, 1 page.

Unknown, Author, "LS on Status of Radio-Interference based Synchronization", 3GPP TSG RAN WG3 Meeting #94, R3-140997, Seoul, Korea, May 19-23, 2014, pp. 1-2.

* cited by examiner

ENABLING INTERFERENCE MITIGATION FOR OVER-THE-AIR SYNCHRONIZATION

RELATED APPLICATION

This application claims priority to U.S. provisional application Ser. No. 62/040,401, filed 21 Aug. 2014, the entire contents of which are incorporated herein by reference.

TECHNICAL FIELD

The present disclosure relates generally to wireless communication systems, and more specifically relates to techniques for reducing interference to reference signals used for synchronization procedures.

BACKGROUND

The 3rd Generation Partnership Project (3GPP) is responsible for the standardization of the Universal Mobile Telecommunication System (UMTS) and the fourth-generation wireless system commonly known as Long Term Evolution (LTE). The 3GPP work on LTE is also referred to as Evolved Universal Terrestrial Access Network (E-UTRAN). LTE is a technology for realizing high-speed packet-based communication that can reach high data rates both in the downlink (the link carrying transmissions from the base station to a mobile station) and in the uplink (the link carrying transmissions from a mobile station to the base station), and is thought of as a next generation mobile communication system, relative to UMTS. In order to support high data rates, LTE allows for a system bandwidth of 20 MHz, or up to 100 Hz when carrier aggregation is employed. LTE is also able to operate in different frequency bands and can operate in at least Frequency Division Duplex (FDD) and Time Division Duplex (TDD) modes.

3GPP Long Term Evolution (LTE) technology is a mobile broadband wireless communication technology in which transmissions from base stations (referred to in 3GPP documentation as eNBs) to mobile stations (referred to as user equipment, or UEs) are sent using orthogonal frequency division multiplexing (OFDM). OFDM splits the signal into multiple parallel sub-carriers in frequency. FIG. 1 illustrates the LTE downlink physical resource. As seen in the figure, the basic unit of transmission in LTE is a resource block (RB), which in its most common configuration consists of 12 subcarriers and 7 OFDM symbols (one slot). A unit of one subcarrier and 1 OFDM symbol is referred to as a resource element (RE). Thus, an RB consists of 84 REs.

FIG. 2 illustrates the downlink subframe in LTE. An LTE radio subframe is composed of two slots in time and multiple resource blocks in frequency with the number of RBs determining the bandwidth of the system. Furthermore, the two RBs in a subframe that are adjacent in time are denoted as an RB pair. Currently, LTE supports standard bandwidth sizes of 6, 15, 25, 50, 75 and 100 RB pairs.

In the time domain, LTE downlink transmissions are organized into radio frames of 10 milliseconds in length, each radio frame consisting of ten equally-sized subframes of length Tsubframe=1 ms.

The signal transmitted by an eNB in a downlink subframe may be transmitted from multiple antennas and the signal may be received at a UE that has multiple antennas. The radio channel distorts the signals transmitted from each of the multiple antenna ports. In order to demodulate any transmissions on the downlink, a UE thus relies on reference symbols (RS) that are transmitted on the downlink. These reference symbols and their positions in the time-frequency grid are known to the UE and can be used to determine channel estimates by measuring the effect of the radio channel on these symbols. As of Release 11 of the 3GPP specifications for LTE, there are multiple types of reference symbols. One important type is the common reference symbols (CRS), which are used for channel estimation during demodulation of control and data messages. The CRS are also used by the UE for synchronization, i.e., to align its timing with the downlink signal as received from the eNB. The CRS occur once every subframe.

A key improvement to conventional cellular network deployments involves the deployment of relatively low-power "small cells" so as to overlay a conventional arrangement of co-called "macro cells." The result is often referred to as a "heterogeneous network." Heterogeneous networks, where the macro cells and the small cells have vastly different transmit powers, may be deployed in two main ways. In the first deployment type, the small cell layer and the macro cell layer share the same carrier frequencies. This approach creates interference between the two layers. In the second deployment type, the small cell layer and macro cell layer are on separate frequencies.

The network architecture for LTE allows messages to be sent between eNBs via an X2 interface. The eNB also can communicate with other nodes in the network, e.g., to the Mobility Management Entity (MME) via the S1 interface.

In current specifications for LTE systems (see, e.g., "S1 Application Protocol," 3GPP TS 36.413 v12.2.0, available at www.3gpp.org), methods are specified to allow some self-organizing network (SON) functionality, where an eNB can request information regarding another eNB via the MME. In Error! Reference source not found., a simplified view of the architecture involving E-UTRAN, i.e., the radio access network (RAN) and the core network (CN), is shown.

Currently, a network interface-based signaling approach is used for synchronization purposes among eNBs. This is enabled by means of procedures known as the "S1: eNB Configuration Transfer" and "S1: MME Configuration Transfer" procedures, according to the following steps:

A first eNB, eNB1, generates an eNB Configuration Transfer message containing a SON Information Transfer information element (IE).

The MME receiving the eNB Configuration Transfer message forwards the SON Information Transfer IE towards a target eNB, eNB2, indicated in the IE, by means of the MME Configuration Transfer message.

If the SON Configuration Transfer IE contains a SON Information Request IE set to "Time synchronization Info", the receiving eNB2 may reply with an eNB Configuration Transfer message towards the eNB1, including a SON Information Reply IE and Timing Synchronization Information IE, which contains Stratum Level and Synchronization Status of the sending node.

The MME receiving the eNB Configuration Transfer message from eNB2 forwards it to eNB1 by means of the MME Configuration Transfer message.

In summary, within an eNB CONFIGURATION TRANSFER message from the eNB to the MME, it is possible to indicate a target eNB ID and the SON information that is required from that target eNB. The MME will therefore forward such an information request to the target eNB via a procedure called MME Configuration Transfer. Once the target eNB receives the request, it will reply via the eNB Configuration Transfer towards the MME. This eNB Configuration Transfer message will include the information requested by the source eNB. The MME will forward the information requested to the source eNB by means of a new MME Information Transfer.

If a source eNB requests time synchronization information from a target eNB, the reply contained in the SON Configuration Transfer IE from target eNB to source eNB should include the above-mentioned information elements (IEs):

Stratum level: This is the number of hops between the eNB and the synchronization source. That is, when the stratum level is M, the eNB is synchronized to an eNB whose stratum level is M−1, which in turn is synchronized to an eNB with stratum level M−2 and so on. The eNB with stratum level 0 is the synchronization source.

Synchronization status: This is a flag that indicates whether an eNB is currently in a synchronous or asynchronous state.

OAM Architecture

The management system architecture assumed for the present discussion is shown in FIG. 4. The node elements (NE), also referred to as eNodeBs, are managed by a domain manager (DM), which is also referred to as the operation and support system (OSS). A DM may further be managed by a network manager (NM). Two NEs are interfaced with the X2 interface defined by the 3GPP specifications, whereas the interface between two DMs is referred to by the 3GPP specifications as the Itf-P2P interface. The management system may configure the network elements and may receive observations associated to features in the network elements. For example, a DM observes and configures NEs, while a NM observes and configures DMs, as well as NEs via the intermediate DMs.

By means of configuration via the DM, NM, and related interfaces, functions over the X2 and S1 interfaces can be carried out in a coordinated way throughout the RAN, eventually involving the Core Network, i.e., the MME and S-GWs.

Radio Interface Based Synchronization (RIBS)

In recent progress in 3GPP RAN1's work, it was concluded that it would be beneficial to make use of patterns of time-frequency transmission resources that are selectively muted to ensure low interference, thus enabling RAN nodes in need of over-the-air synchronization to decode a synchronization reference signal that would otherwise be affected by neighbor cell interference and thus not usable. In particular, the resource elements in these muted patterns should be free from any reference signal or any other interfering signal's transmissions.

3GPP working group discussion documents R3-140997, "LS on Status of Radio-Interface Based Synchronization" (available at http://www.3gpp.org/FTP/tsg_ran/WG3_Iu/TSGR3_84/LSin/) and R1-142762, "LS on Radio Interface Based Synchronization" (available at http://www.3gpp.org/Liaisons/Outgoing_LSs/R1-meeting.htm), describe the agreements taken by RAN1 in terms of what characteristics such patterns should have are listed. In summary, the agreements state that the network should support enabling patterns of interference protected time/frequency resources, which can repeat themselves in time according to a period selected out of a range that is specified in the latter of the two documents specified immediately above. It should be noted that such patterns are different from existing Almost Blank Subframes patterns, which are used for enhanced inter-cell interference coordination (eICIC). The difference is that in ABS patterns, reference signals are transmitted without interruption, which is one of the reasons why such patterns are made of so-called "Almost" blank subframes.

The 3GPP discussion documents identified above specify that the reference signals that a RAN node can use to achieve synchronization could be different, and that the interference protected patterns should therefore ensure protection towards all reference signals. In summary, the information from these documents that are relevant to the specification of signaling needed to make the radio interface based synchronization mechanisms work are as follows. Excerpts from these documents are below, to provide additional context for the detailed discussion that follows.

Excerpts from R3-140997:
Agreement:
Specify listening RS(s) including RS pattern, and subframe periodicity, and offset, for both FDD and TDD
Agreement:
PRS and/or CRS is used as the listening RS for RIBS
FFS: Down-select of listening RS
Subframe-level muting is supported for RIBS
Excerpts from R1-142762:
For network listening, the following RS pattern is supported by configuration
CRS only
The number of CRS ports can be 1 or 2
CRS and PRS
The number of CRS ports can be 1 or 2
The eNB should use one periodicity and offset of network listening RS that can be selected from the following recommended range of values
A range of values (>=2) for the periodicity
Choose all or a subset from [1280 ms, 2560 ms, 5120 ms, 10240 ms]
There is no consensus in RAN1 on the additional periodicities of 640 ms and 20480 ms
Values of offsets FFS
The max number of hops is kept at 3.

SUMMARY

The agreements taken in the RAN1 working group of 3GPP leave unresolved the problem of how to enable inter-node communication aimed at coordinating the enabling of interference-protected patterns. Embodiments of the presently disclosed techniques and apparatus thus include methods for enabling and disabling of muting patterns in RAN nodes for the purpose of allowing better detection and use of reference symbols (RS) used for synchronization.

A first aspect of the presently disclosed invention is directed to methods, in a base station operating in a wireless communications network, for facilitating over-the-air synchronization with a neighboring base station. An example method according to the first aspect includes determining that a first neighbor cell of a plurality of neighbor cells is interfering with or is likely to interfere with a signal, from a second neighbor cell, that is used for synchronization. The method further includes sending, towards the first neighbor cell, a request for activation of a reference signal muting pattern by the first neighbor cell, the request including information identifying the second neighbor cell or a stratum of the second neighbor cell.

A second aspect of the presently disclosed invention is also directed to methods, in a base station operating in a wireless communications network, for facilitating over-the-air synchronization by a neighboring base station. An example method according to this second aspect includes receiving a request for activation of a reference signal muting pattern for a cell supported by the base station, the request including information identifying a source of synchronization for the neighboring base station or a stratum of the source of synchronization for the neighboring base station. The method further includes retrieving information regarding a synchronization pattern used by the source of synchronization for the neighboring base station, selecting a reference signal muting pattern based on the synchronization pattern used by the source of synchronization for the neighboring base station, and activating the selected reference signal muting pattern in response to the request.

A third aspect of the presently disclosed invention is directed to methods, in a control node operating in a wireless communications network, for facilitating over-the-air synchronization by a first base station with a first neighbor cell of a plurality of neighbor cells. An example method according to this aspect includes receiving a first message from the first base station, the first message indicating that reference signal muting by at least a second neighbor cell of the plurality of neighbor cells is needed, the first message including information identifying a source of synchronization for the first base station or a stratum of the source of synchronization for the first base station. The method further includes sending a second message to at least a second base station corresponding to the second neighbor cell, the second message requesting activation of a reference signal muting pattern for the second neighbor cell and including the information identifying a source of synchronization for the first base station or a stratum of the source of synchronization for the first base station.

A fourth aspect of the presently disclosed invention is directed to base station apparatuses arranged to communicate with one or more mobile stations and to communicate with one or more other base stations or with one or more control nodes, or one or more of each. An example base station apparatus according to this fourth aspect is adapted to determine that a first neighbor cell of a plurality of neighbor cells is interfering with or is likely to interfere with a signal, from a second neighbor cell, that is used for synchronization, and to send, towards the first neighbor cell, a request for activation of a reference signal muting pattern by the first neighbor cell, the request including information identifying the second neighbor cell or a stratum of the second neighbor cell.

A fifth aspect of the presently disclosed invention is also directed to base station apparatuses arranged to communicate with one or more mobile stations and to communicate with one or more other base stations or with one or more control nodes, or one or more of each. An example base station apparatus according to this fifth aspect is adapted to receive a request for activation of a reference signal muting pattern for a cell supported by the base station, the request including information identifying a source of synchronization for a neighboring base station or a stratum of the source of synchronization for the neighboring base station. The base station apparatus is further adapted to retrieve information regarding a synchronization pattern used by the source of synchronization for the neighboring base station, select a reference signal muting pattern based on the synchronization pattern used by the source of synchronization for the neighboring base station, and activate the selected reference signal muting pattern in response to the request.

A sixth aspect of the presently disclosed invention is directed to control node apparatuses configured to communicate with a plurality of base stations. An example control node apparatus according to this aspect is adapted to receive a first message from the first base station, the first message indicating that reference signal muting by at least a second neighbor cell of the plurality of neighbor cells is needed, the first message including information identifying a source of synchronization for the first base station or a stratum of the source of synchronization for the first base station. The example control node apparatus is further adapted to send a second message to at least a second base station corresponding to the second neighbor cell, the second message requesting activation of a reference signal muting pattern for the second neighbor cell and including the information identifying a source of synchronization for the first base station or a stratum of the source of synchronization for the first base station.

Several variations of the above-summarized methods and apparatuses are described in detail below, as are corresponding computer program products and computer-readable media.

DETAILED DESCRIPTION

Figure 1:
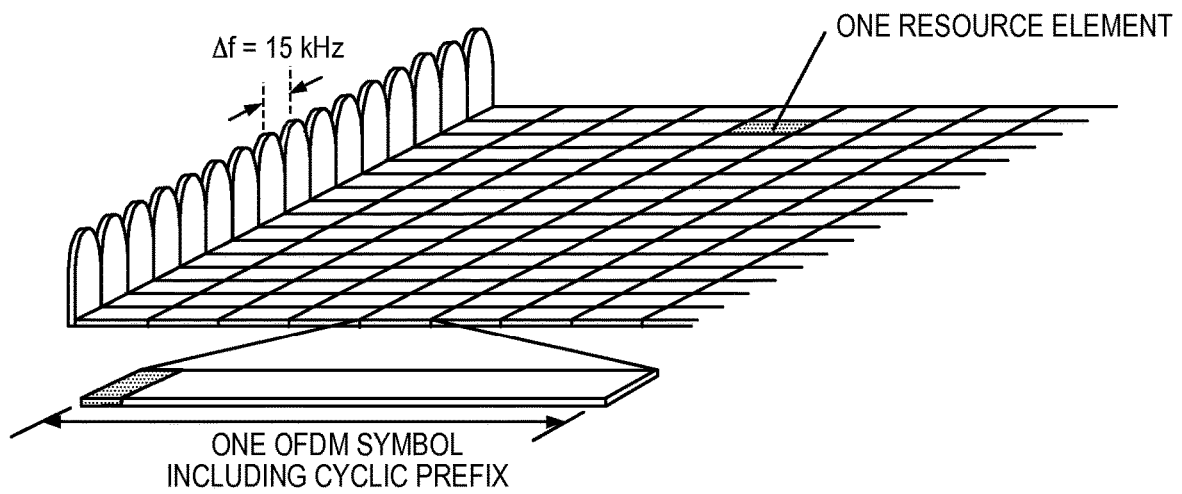
FIG. 1 illustrates time-frequency resources in a system using Orthogonal Frequency-Division Multiplexing (OFDM).
Figure 2:
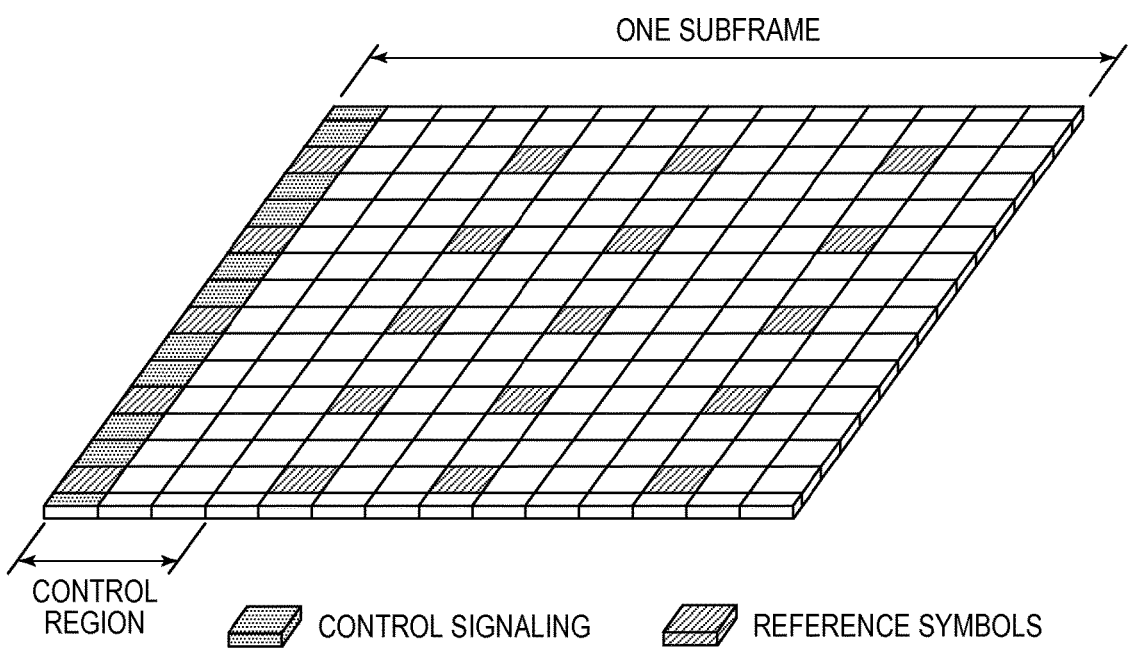
FIG. 2 illustrates a subframe in an LTE system.

In the discussion that follows, specific details of particular embodiments of the presently disclosed techniques and apparatus are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes.

Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

References throughout the specification to "one embodiment" or "an embodiment" mean that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 5:
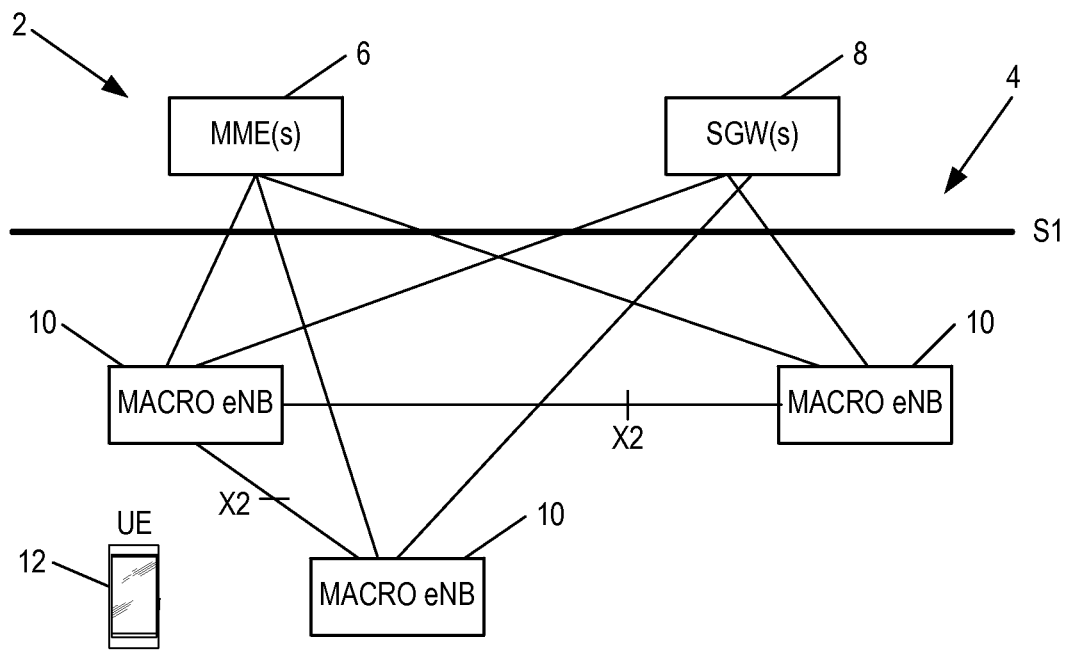
FIG. 5 is another view of the E-UTRAN system.

While the following examples are described in the context of LTE systems, the principles described in the following disclosure may be equally applied to other cellular networks. Other wireless systems, including WCDMA, WiMax, UMB and GSM, may also benefit from exploiting the ideas covered within this disclosure. Also note that terminology such as eNodeB and UE should be considering non-limiting and does not necessarily imply a certain hierarchical relation between the two; in general "eNodeB" could be considered as device 1 and "UE" device 2, where these two devices communicate with one another over some radio channel. Similarly, when talking about signaling over an X2 backhaul, the solutions are not necessarily limited to communication between eNBs but the communicating nodes can be any node terminating the backhaul interface over which the information described is transmitted FIG. 5 is another view of an E-UTRAN architecture, as part of an LTE-based communications system 2. Nodes in the core network 4 include one or more Mobility Management Entities (MMEs) 6, which are key control nodes for the LTE access network, and one or more Serving Gateways (SGWs) 8, which route and forward user data packets while acting as mobility anchors. The MMEs 6 and SGWs 8 communicate with base stations 10 referred to in LTE as eNBs, over interfaces specified by the 3GPP standards, such as the S1 interface. The eNBs 10 can include two or more of the same or different categories of eNBs, e.g., macro eNBs, and/or micro/pico/femto eNBs. The eNBs 10 communicate with one another over an interface, for example an X2 interface. The S1 interface and X2 interface are defined in the LTE standard. A UE 12 can receive downlink data from and send uplink data to one of the base stations 10 with that base station 10 being referred to as the serving base station of the UE 12. It should be appreciated that while the techniques described herein may be applied in the context of an E-UTRAN network, e.g., as illustrated in FIG. 1, the techniques may also be applied in other network contexts, including in UTRA networks, or in peer-to-peer communications, such as in an ad-hoc network or in a so-called device-to-device scenario.

In some of the embodiments described herein, the non-limiting terms "user equipment" and "UE" are used. A UE, as that term is used herein, can be any type of wireless device capable of communicating with a network node or another UE over radio signals, including an MTC device or M2M device. A UE may also be referred to as a radio communication device, or a target device, and the term is intended to include device-to-device UEs, machine-type UEs or UEs capable of machine-to-machine communication, sensors equipped with a UE, wireless-enabled table computers, mobile terminals, smart phones, laptop-embedded equipped (LEE), laptop-mounted equipment (LME), USB dongles, wireless customer-premises equipment (CPE), etc.

Figure 6:
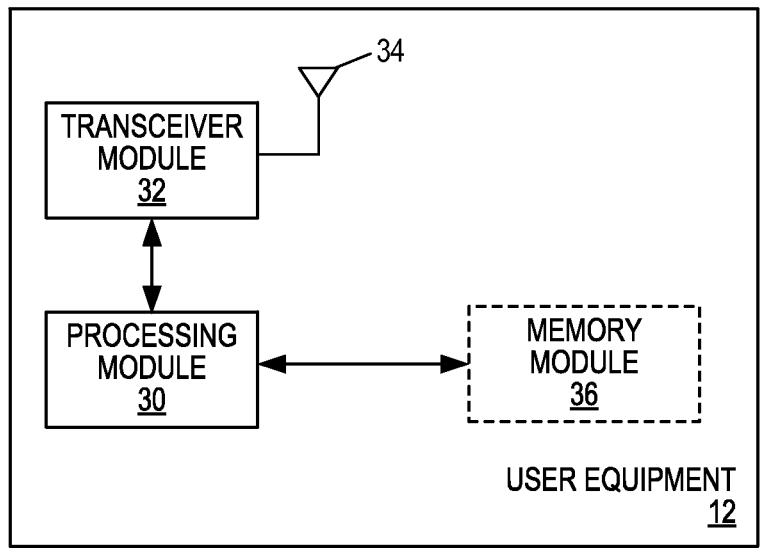
FIG. 6 illustrates components of an example user equipment.

FIG. 6 shows a user equipment (UE) 12 that can be used in one or more of the non-limiting example embodiments described. The UE 12 comprises a processing module 30 that controls the operation of the UE 12. The processing module 30, which may comprise one or more microprocessors, microcontrollers, digital signal processors, specialized digital logic, etc., is connected to a receiver or transceiver module 32 with associated antenna(s) 34 which are used to receive signals from and/or to transmit signals to a base station 10 in the network 2. The user equipment 12 also comprises a memory circuit 36 that is connected to the processing module 30 and that stores program code and other information and data required for the operation of the UE 12. Together, the processing module and memory circuit may be referred to as a "processing circuit," and are adapted, in various embodiments, to carry out one or more of any UE-based techniques described below.

Also, in the description of some embodiments below, the generic terminology "radio network node" or simply "network node (NW node)" is used. These terms refer to any kind of wireless network node, such as a base station, a radio base station, a base transceiver station, a base station controller, a network controller, an evolved Node B (eNB), a Node B, a relay node, a positioning node, a E-SMLC, a location server, a repeater, an access point, a radio access point, a Remote Radio Unit (RRU) Remote Radio Head (RRH), a multi-standard radio (MSR) radio node such as MSR BS nodes in distributed antenna system (DAS), a SON node, an O&M, OSS, or MDT node, a core network node, an MME, etc.

Figure 7:
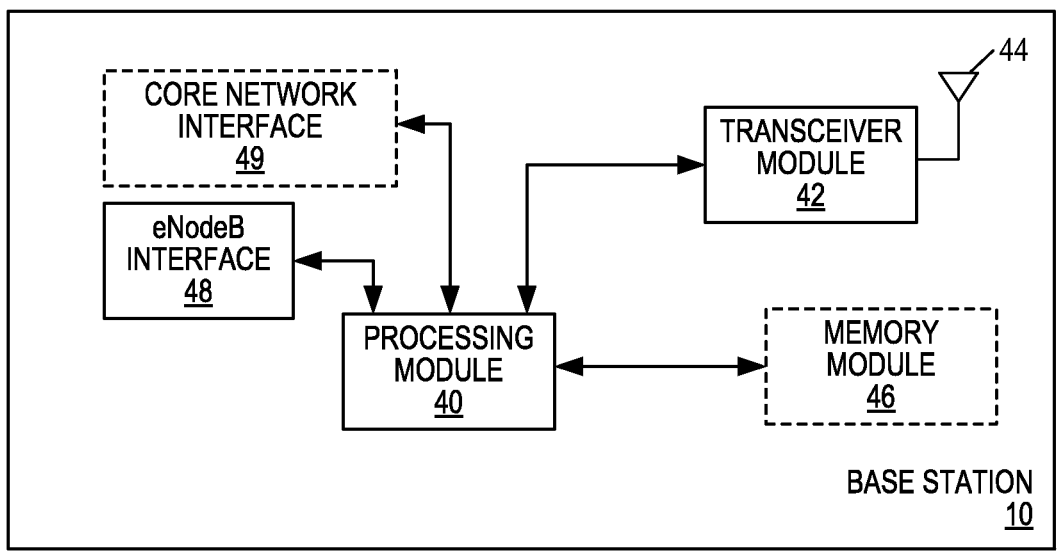
FIG. 7 illustrates components of an example base station.

FIG. 7 shows a base station 10 (for example a NodeB or an eNodeB) that can be used in example embodiments described. It will be appreciated that although a macro eNB will not in practice be identical in size and structure to a micro eNB, these different examples of base station 10 will generally include similar or corresponding components, although the details of each of those components may vary to accommodate the different operational requirements of a particular embodiment.

The illustrated base station 10 comprises a processing module 40 that controls the operation of the base station 10. The processing module 40, which may comprise one or more microprocessors, microcontrollers, digital signal processors, specialized digital logic, etc., is connected to a transceiver module 42 with associated antenna(s) 44, which are used to transmit signals to, and receive signals from, user equipments 12 in the network 2. The base station 10 also comprises a memory circuit 46 that is connected to the processing module 40 and that stores program and other information and data required for the operation of the base station 10. Together, the processing module 40 and memory circuit 46 may be referred to as a "processing circuit," and are adapted, in various embodiments, to carry out one or more of the network-based techniques described below.

Figure 3:
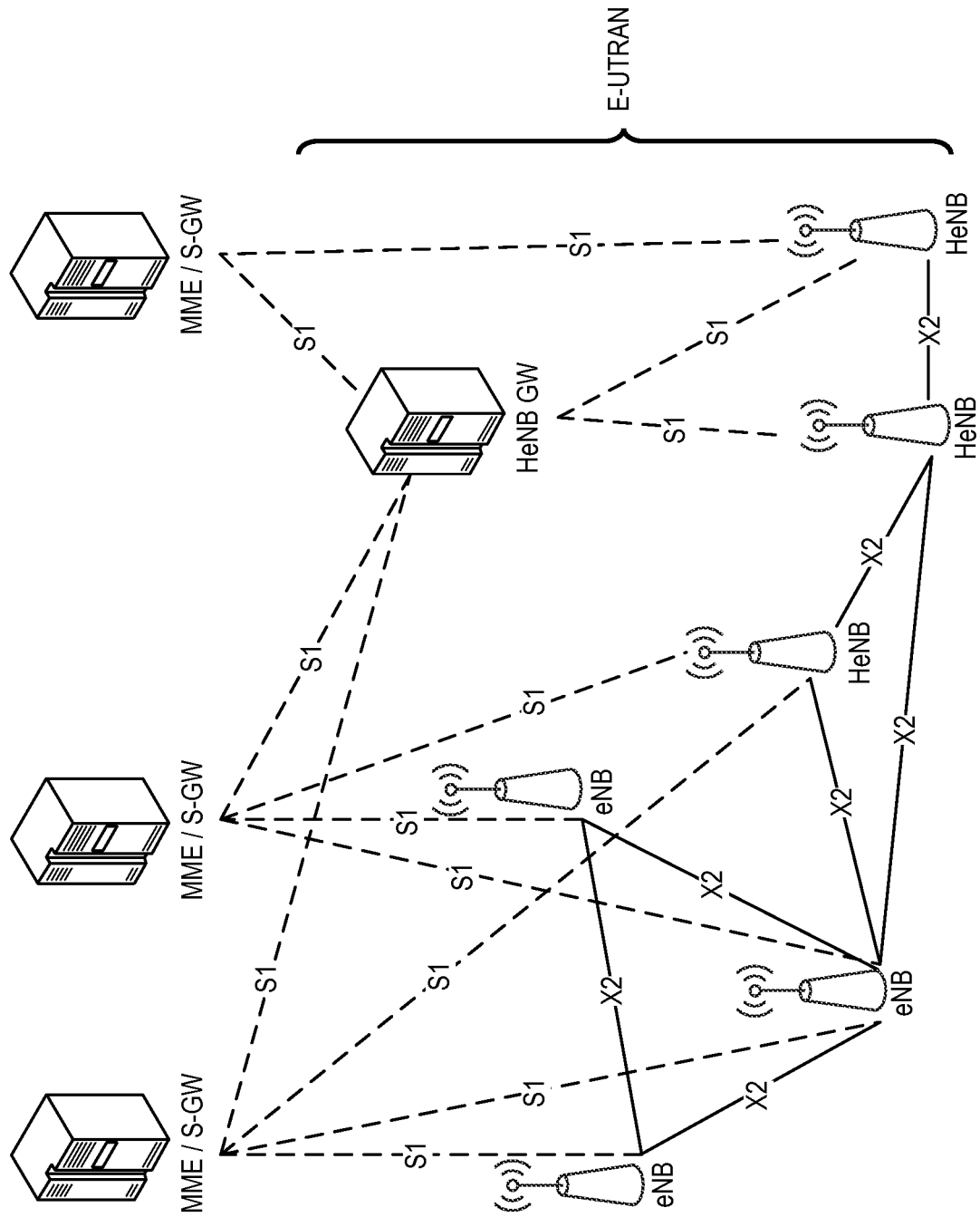
FIG. 3 illustrates a simplified version of the architecture of the E-UTRAN system.
Figure 4:
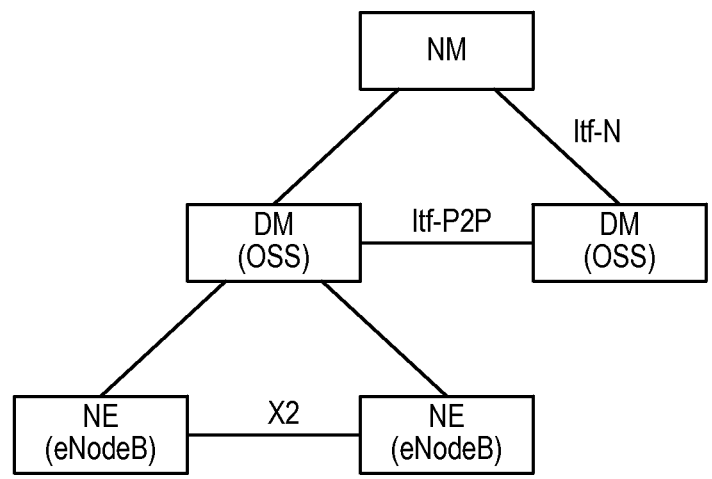
FIG. 4 illustrates a management architecture.

The base station 10 also includes components and/or circuitry 48 for allowing the base station 10 to exchange information with other base stations 10 (for example, via an X2 interface) and components and/or circuitry 49 for allowing the base station 10 to exchange information with nodes in the core network 4 (for example, via the S1 interface). It will be appreciated that base stations for use in other types of network (e.g., UTRAN or WCDMA RAN) will include similar components to those shown in FIG. 3 and appropriate interface circuitry 48, 49 for enabling communications with the other network nodes in those types of networks (e.g., for communications with other base stations, mobility management nodes and/or nodes in the core network).

It will be appreciated that other nodes in the communication network may have a structure that is similar to that illustrated in the FIG. 7, with the transceiver module 42 omitted in those nodes that are not radio base stations. Nodes in the core network may have a RAN network interface circuit in place of core network interface circuit 49, in some embodiments.

Many features of 3GPP Long Term Evolution (LTE) technology, as well as of other technologies, benefit from the base stations (referred to as eNBs) in the system being synchronized with one another with respect to transmit timing and frequency. Synchronization of eNBs is typically done using a global navigation satellite system (GNSS) such as the global positioning system (GPS) or by using network-based methods such as IEEE 1588v2. However, when such methods are unavailable to an eNB, it may be possible to use LTE reference signals transmitted by other eNBs to acquire synchronization. Such techniques are currently being discussed in 3GPP for small cells in LTE Rel-12, where a small cell can obtain synchronization from a macro cell or from other small cells.

One problem, which was addressed by International Patent Application serial no. PCT/EP2015/067398 (hereinafter, the '398 application), filed 29 Jul. 2015, the entire contents of which are incorporated herein, is how to enable a mechanism that allows the RAN node in need of synchronization to correctly detect and use the most appropriate synchronization reference signal by means of enabling a pattern of resources protected from interference on which the node can listen to the synchronization RS and synchronize to it. Such pattern will be also referred to as a "muting pattern" or "RIBS muting pattern" herein.

As discussed in the '398 application, enabling a muting pattern should depend on whether there is a node in need of interference protection for synchronization purposes. Indeed, keeping a set of time frequency resources muted in any cell generally results in a loss of resources and a decrease of system performance. Therefore, the activation and deactivation of muting patterns from relevant interfering cells should depend on whether there are nodes in need of synchronizing to other cells that would benefit from such interference protected patterns.

Another problem addressed by the '398 application is how to achieve coordination of muting patterns and the activation of muting patterns. Namely, the RAN node in charge of activating muting patterns is the only node aware of the traffic demand on the node at activation time. It should therefore be up to this node to decide the amount of muting to apply that is feasible with the traffic demand sustained. At the same time, it would be beneficial to address methods that enable a wider number of cells interfering at the same time with the synchronization RS to activate coordinated muting patterns, i.e., muting patterns sharing the same muting resources.

As discussed in the '398 application, in the 3GPP discussion document R3-14121, "Discussion on How to Support RIBS" (available at http://www.3gpp.org/ftp/Meetings_3GPP_SYNC/RAN3/Docs/), solutions trying to address signaling of muting pattern information for RIBS purposes are presented. However, all of the presented solutions are subject to several shortfalls. First, the solutions proposed are suboptimal and inefficient because they all rely on an indication sent from the node in need of synchronization to the node selected for synchronization that synchronization will happen with one of its cells. This indication is not needed because, upon selection of a synchronization node, there are no changes in the mode of operation of the node providing synchronization signals. Therefore this indication results in unnecessary signaling. Second, these solutions are non-scalable and inefficient because they are based on the communication of muting patterns from the node in need of synchronization to the interfering nodes. The node in need of synchronization is not aware of the load demand conditions of the interfering nodes and would not be able to accurately determine how much resource muting the interfering node would be able to afford. In addition, in case a second node in need of synchronization requested the same interfering node to activate a different muting patterns, the interfering node may have either to reject the request due to an excessive overall amount of resources to mute or it may accept it with the consequence of a higher loss of capacity due to different, possibly non-overlapping, muting patterns The techniques and apparatus disclosed in the '398 application enable the exchange of information about the possibility of activating muting patterns at interfering cells that would allow a node that needs to correctly and timely decode a synchronization signal to do so.

These embodiments, which are described in detail below, also allow activation and deactivation of muting patterns to occur only when needed. Namely, resources are muted only when there is a need for interference reduction for the purpose of synchronization, in some embodiments, avoiding unnecessary losses in capacity.

Embodiments also allow a node that receives a request to mute resources to select an appropriate muting pattern according to its traffic conditions and cell status.

Detailed below are specific embodiments of muting pattern activation and deactivation mechanisms, where muting can be activated simultaneously on a number of nodes and cells. The latter can be determined by the stratus number of a node or by an existing understanding of the interfering cells for a given node in need of synchronization.

Embodiments allow for coordination of muting patterns amongst different nodes, so to allow for maximum interference protection on muted resources, while minimizing capacity losses In order to explain a first method according to some embodiments of the techniques described in the '398 application, an example scenario is detailed here. In particular, the scenario takes as an example the LTE system and consists of a case where an eNB detects a cell's reference signal suitable for synchronization and with stratum number lower than other detected RSs. Note that, by convention, the lower the stratum level, the higher the signal accuracy is with respect to a synchronization source such as GNSS. In this case it would be beneficial if other cells interfering with the synchronization signal could adopt a muting pattern where all RSs are muted in certain subframes and according to a certain pattern that can repeat with a certain period, e.g., as in the 3GPP documents R3-140997 and R1-142762 mentioned above.

Figure 8:
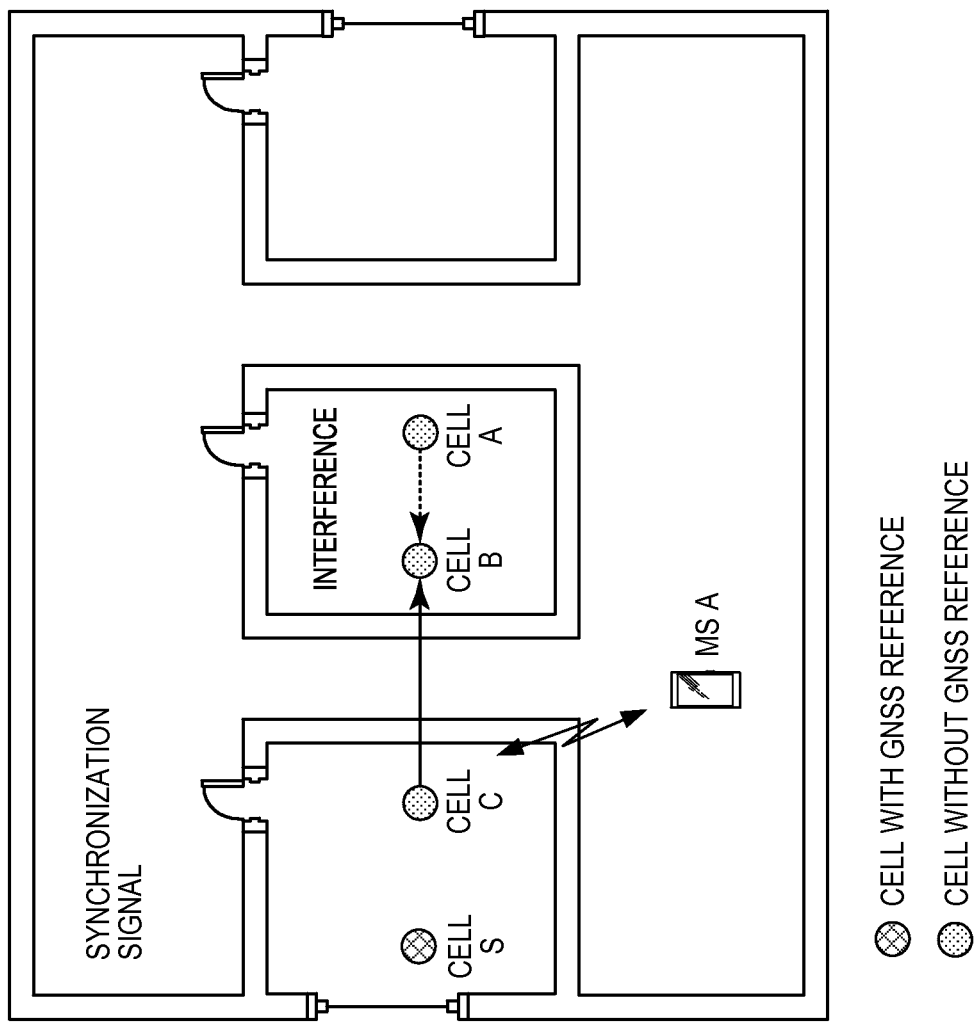
FIG. 8 shows an example scenario in which the presently disclosed techniques may be employed.

FIG. 8 illustrates a possible scenario where such radio interface based synchronization (RIBS) may be needed. In FIG. 8 it can be seen that Cell S emits a reference signal that is GNSS-synchronized. eNB C, serving Cell C, can deduce such information via, for example, S1 signaling of the SON Information IE, namely by receiving a Time Synchronization Info IE where the Stratum Level IE has been set to "0", as per specifications in 3GPP TS 36.413, v12.2.0.

Similarly, eNB A, serving Cell A, can deduce that Cell C is a better synchronization source than Cell B and may try to use Cell C's RS to synchronize. However, in order to achieve correct detection of Cell C's RS, eNB A needs to be protected from interference from Cell B.

For this reason RAN1 has agreed that it would be beneficial to establish a subframe-muting pattern, i.e., a pattern of subframes where all RS signals of interfering cells are muted.

As an assumption of this first method it is considered that the muting patterns available for activation in cells of a RAN node do not change frequently. Therefore these patterns can be configured from a centralized entity such as the OAM.

In a first embodiment of this method, mechanisms are described that allow muting patterns in RAN node's cells to be activated and deactivated only when needed.

Such activation and deactivation shall be triggered by specific events. For example, only if a RAN node decides to synchronize via a neighbor cell's RS signal considered the best available synchronization source, and only if such synchronization requires other neighbor cells to mute (or reduce interference on) time-frequency resources in order to properly decode the signal, muting patterns in neighbor cells need to be activated. Likewise in the example, such patterns would need to be deactivated as soon as they are no more needed, for example if the source of synchronization RS is not available any longer or if a better synchronization signal not requiring muting from neighbor cells becomes available.

Activation and deactivation of muting patterns are both important. In fact, maintaining muting patterns activated unnecessarily would incur a loss of time/frequency resources and therefore degradation of system performance and reduced capacity.

On the basis of the observations above, one way to achieve activation and deactivation of muting patterns includes the following steps, all or some of which may be used in various embodiments:

Advertising the availability of muting patterns by means of dedicated signaling or by enhancing existing signaling. For example, in the case of LTE this might consist of enhancing the SON Information Reply IE (received as a consequence of sending a SON Information Request IE set to "Time Synchronization Info") with new information flagging muting patterns availability.

Enabling a RAN node (for example an eNB suffering from neighbor cells' interference) to request neighbor RAN nodes' activation of muting patterns by means of dedicated signaling or by enhancing existing signaling. For example, in the case of LTE this might consist of enhancing the SON Information Request IE with information indicating an activation request. The RAN node could also request the specific resources that should be muted, i.e., the pattern and periodicity.

Enabling a RAN node (for example an aggressor eNB) to signal muting patterns and pattern periods by means of dedicated signaling or by enhancing existing signaling. For example, in the case of LTE this might consist of enhancing the SON Information Reply IE with new information indicating a chosen muting pattern, a pattern period and other related information.

Enabling a RAN node (for example an eNB) to request de-activation of muting patterns by means of dedicated signaling or by enhancing existing signaling. For example, in the case of LTE this might consist of enhancing the SON Information Request IE with information requesting deactivation of muting patterns.

Figure 9:
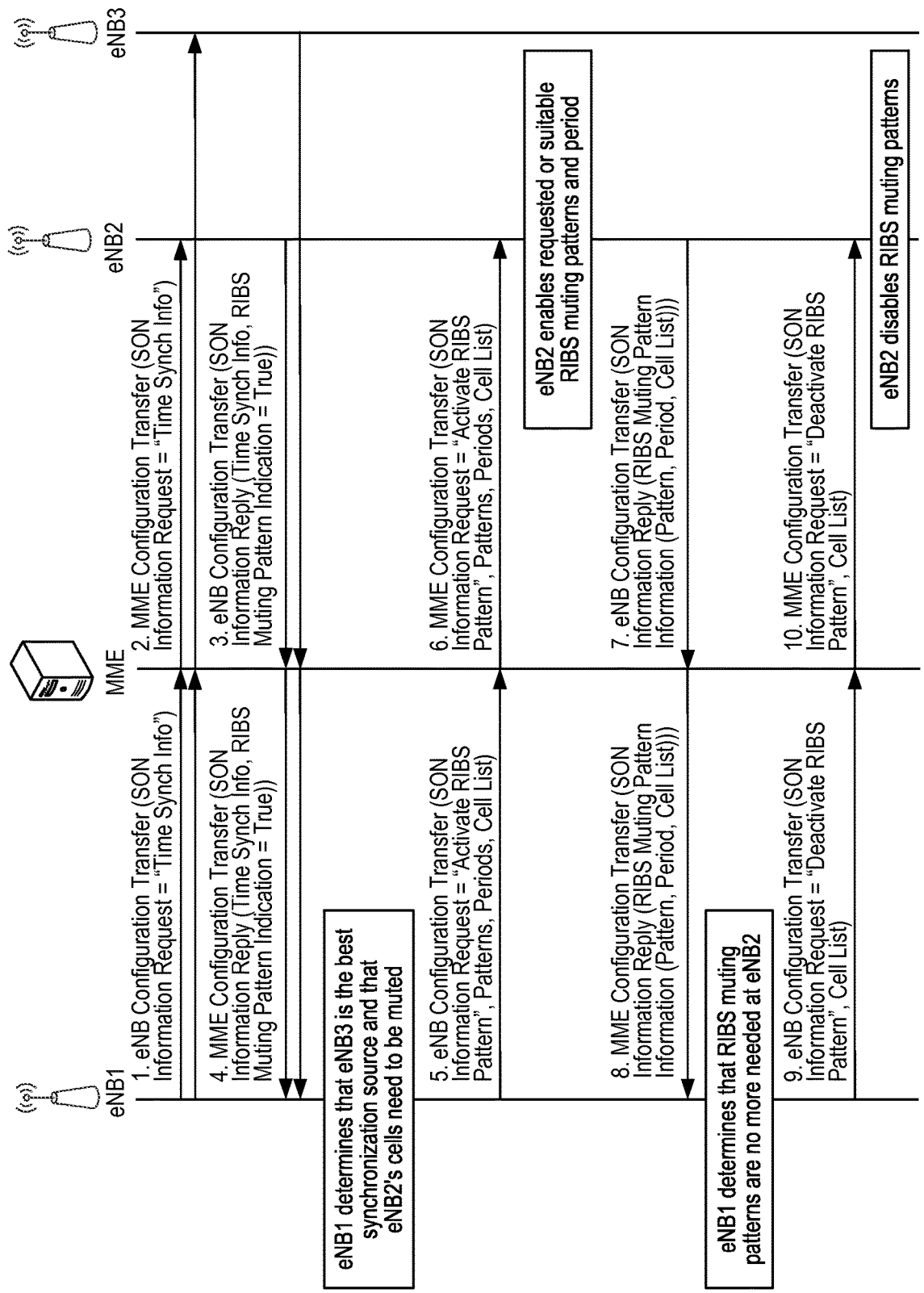
FIG. 9 is a signal flow diagram illustrating some embodiments of the presently disclosed techniques.

In the case of an LTE system the above steps can be achieved by means of the example procedures shown in FIG. 9, which illustrates an example signaling procedure to enable/disable muting patterns for RIBS.

FIG. 9 can be described as follows:

1-2) An eNB1 in need of synchronization detects one or more cells from eNB2 and eNB3 and sends an eNB Configuration Transfer message with SON Information Request IE set to "Time Synchronization Info" to eNB2 and eNB3. The SON Information Request IE will be transparently forwarded as part of an MME Configuration Transfer to the target eNB2 and eNB3.

3-4) eNB 2 and eNB3 respond with an eNB Configuration Transfer message containing the SON Information Reply IE. This IE contains information such as the Time Synchronization Information IE, and also contains a new optional flag stating whether RIBS muting patterns are available for activation or not (for example, the muting patterns may not be available because they are not supported in the receiving eNB or because traffic conditions are such that no muting can be supported). The information will be forwarded to eNB1 in MME Configuration Transfer messages 5-6) eNB1 evaluates which RS signals amongst cells of eNB2 and eNB3 are the best available. Such evaluation may be done on the basis of parameters such as signal strength, eNB stratum level, synchronization status. Assuming that one of eNB3's cells is the best synchronization source, eNB1 determines that for correct detection of RS from eNB3, RS signals from eNB2 need to be muted. Therefore, eNB1 sends an eNB Configuration Transfer message towards eNB2 with a SON Information Request IE set to a new value, e.g., "Activate RIBS Pattern".

The message may also contain a list of cells for which the muting pattern should be applied, depending on what eNB1 considers the strongest interfering cells. In addition, the message may also contain the set of resources which should be muted, e.g., subframe pattern and periodicity. Multiple options for such muting could be provided with some of the options being subsets of others.

7-8) eNB2, namely the interfering eNB, selects the pattern and pattern periodicity that best suits its conditions such as traffic load and enables such pattern for the cells indicated by eNB1. eNB2 responds with an eNB Configuration Transfer message towards eNB1, where the SON Information Reply IE contains RIBS muting patterns characteristics and list of cells for which the patterns have been enabled 9-10) At a later point in time, it may occur that muting from eNB2's cells may no more be needed. For example, eNB1 may not need the RS of eNB3 as source of synchronization or indeed it may occur that eNB3's signals become unavailable. In this case, eNB1 may request deactivation of the muting patterns via an eNB Configuration Transfer message towards eNB2 where the SON Information Request IE or another new or existing IE has been set to a new value such as "Deactivate RIBS Pattern". Optionally, a list of cells for which deactivation has to occur can be specified.

The procedure described in FIG. 9 follows two simple and advantageous principles, namely: reusing existing procedures to exchange information about RIBS muting patterns and enabling activation and deactivation of muting patterns.

Note that by reusing existing procedures it is possible to save signaling messages. For example, as shown in FIG. 9, a SON Information Reply IE may contain at the same time "Time Synchronization Information" and an indication of RIBS muting patterns availability.

In one variation of the method above, the RAN node receiving the muting pattern activation request does not reply with a muting pattern but only with a pattern period. The assumption in this case would be that muting patterns are configured in each RAN node in a given neighborhood in a way that each node knows which pattern is supported by a node to which an activation request is sent.

In another variation of the above method, the exchange of information relative to muting patterns activation and deactivation may occur via the X2 interface. A number of procedures can be used to enable such information exchange, for example: X2: Load Information, X2: Resource Information Request/Response/Update, X2 Setup Request/Response, eNB Configuration Update.

Figure 10:
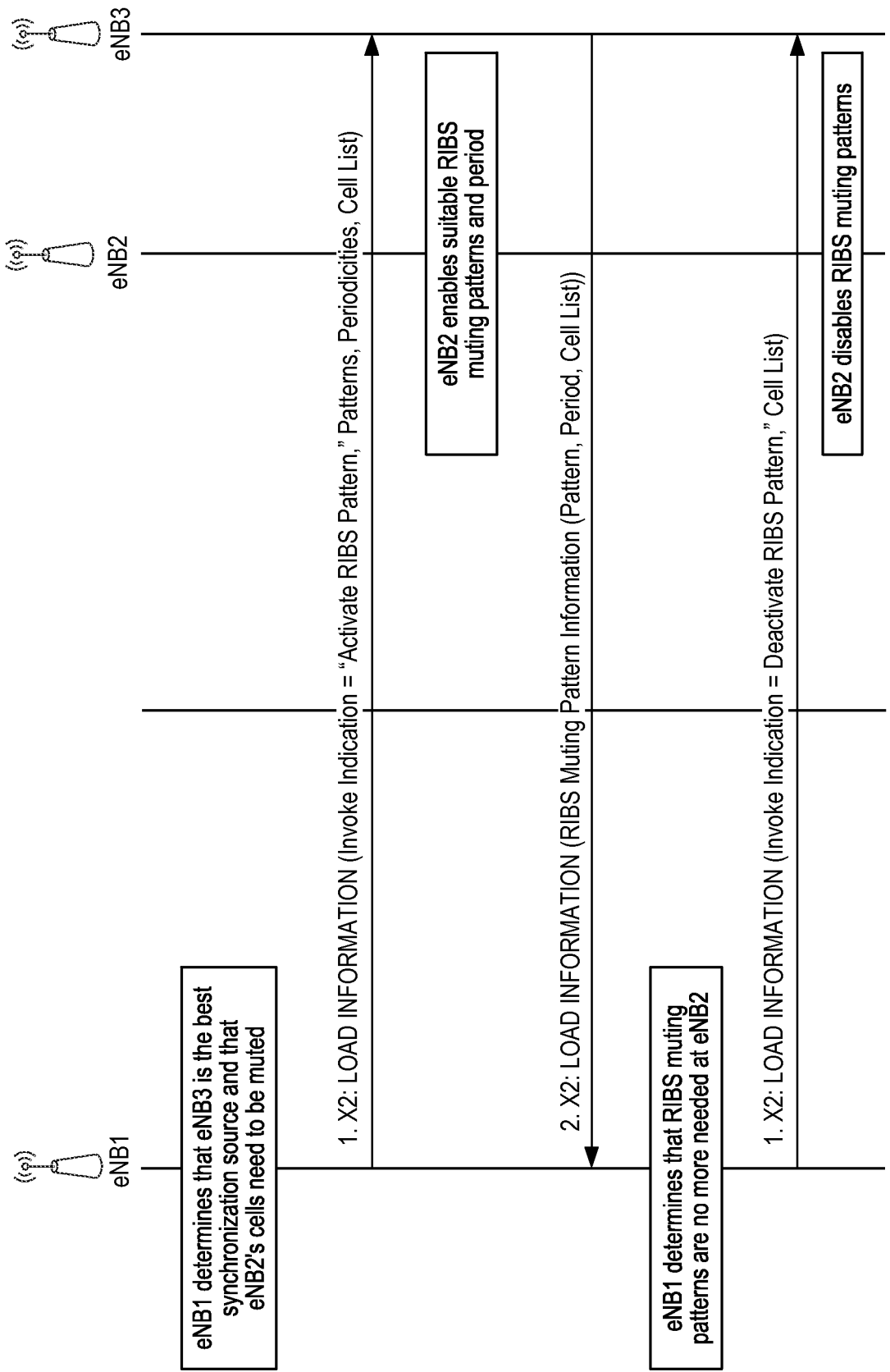
FIG. 10 is another signal flow diagram, again illustrating some embodiments of the presently disclosed techniques.

An example of how such procedure can be enabled over X2 is provided in FIG. 10, which shows an example of the exchange of information regarding RIBS muting patterns over X2.

In FIG. 10 it is assumed that signaling enabling eNB1 to discover which node is the best synchronization source has already occurred. Such signaling could consist of reusing the S1: eNB Configuration Transfer and S1: MME Configuration Transfer messages or equivalently it could consist of new X2 signaling carrying equivalent information.

It is also assumed that eNB1 knows whether support for RIBS muting patterns is available at eNB2 and eNB3. This can be achieved via the techniques outlined in previous embodiments or via new signaling over X2.

FIG. 10 can be described as follows.

Message 1: RIBS muting pattern activation is shown in message 1 and it is achieved by means of enhancing the LOAD INFORMATION message and adding a new code value to the Invoke Indication IE. Such new value could be set to "Activate RIBS Pattern" or any equivalent value triggering an activation request. The activation request can be sent to one or more cells that can be identified in the message by means of their Cell IDs. The request can also include a requested muting pattern and periodicity or a set of multiple patterns and periodicities. If multiple patterns are provided, some patterns and periodicities can be a subset of others.

Message 2: eNB analyzes whether muting patterns can be activated. If this is possible, it enables muting patterns and sends muting pattern structures, pattern periods and the cell identifier to which each of the specified patterns applies in a LOAD INFORMATION message back to eNB1.

Message 3: In the case where muting patterns from eNB2 do not need to be active anymore, eNB1 may send an X2: LOAD INDICATION message where the Invoke Indication IE has been set to a new value indicating deactivation of the muting pattern. This new value may be set for example to "Deactivate RIBS Pattern" or any equivalent value triggering a deactivation request. The deactivation request can be sent to one or more cells that can be identified in the message by means of their Cell IDs FIG. 9, as discussed above, illustrates an example signaling procedure to enable/disable muting patterns for RIBS. FIG. 10 provides an example procedure relying on base-station-to-base-station messaging over the X2 interface. Following are a series of more specific embodiments that build upon these basic procedures.

In one specific embodiment of the methods described above, the configuration of RIBS muting patterns at different RAN nodes is done in a way that such patterns share part or all of the muted resources. Namely, a configuration node such as the OAM system can configure RIBS muting patterns in different RAN nodes in a way that they will enable muting of all or a group of RAN nodes activating the patterns on at least a subset of muted resources. This is important because it allows interference reduction on at least a subset of resources even when more nodes are involved in activation of muting patterns.

In a variation, the coordination node may configure coordinated patterns (for example the same patterns) for all RAN nodes having the same stratum level. In this case, the RAN node grouping for muting patterns coordination purposes would be done on the basis of Stratum Level. Grouping of RAN nodes or cells for the purpose of assigning coordinated muting patterns can be done according to any of one or more different criteria, for example their maximum transmission powers, cell types (e.g. macro, micro, pico), etc.

In another embodiment of the first method described, a RIBS muting pattern activation message may not be needed for each node needed to activate muting patterns. Namely, a RAN node may be able to send a RIBS muting pattern activation message to a single node. This message may trigger activation of muting patterns in multiple nodes. As an example, all the nodes activating muting patterns may share the same stratum level or may have stratum level equal or higher than a certain threshold.

For example, in the case of LTE, eNB1 may detect a number of interfering cells belonging to eNB2 and eNB3. eNB2 and eNB3 may have the same stratum level. eNB1 sends a RIBS muting pattern activation request to eNB2. This may trigger activation of muting patterns on some or all of eNB2's and eNB3's cells. Such list of cells may be determined by considering the node requesting activation (e.g., by analyzing which cells are the strongest interferers to that node either at the node or via communication with another central node) and/or by considering the Stratum Level of the eNBs for which activation is triggered. The muting patterns activated at the same time may be coordinated, i.e., they may have some or all muted resources overlapping.

The latter method allows a reduction in the amount of signaling needed and simplifies activation procedures, while activating at the same time patterns that would drastically reduce the interference experienced by the requesting node.

In another embodiment of the first method described, a list of cells for which RIBS muting pattern activation/deactivation is requested may not be included in the message carrying the activation/deactivation request. The RAN node receiving the activation/deactivation request may automatically calculate the cells for which muting patterns should be activated by means of analyzing the requesting node and eventually the cell for which interference protection is requested. The node requested to activate/deactivate muting patterns may therefore calculate which cells are the strongest interferers for the requesting cell and by means of implementation enable/disable muting patterns on such cells. Alternately, the determination of the set of interferers may be done by another RAN node, in some embodiments.

In the methods described in the '398 application and summarized above, left unresolved is the issue of how to enable the interfering eNB to enable muting patterns that can match the pattern of reference signals transmitted by the source of synchronization node and at the same time that are coordinated with other interfering nodes. Namely, in these techniques, full freedom is left to the interfering eNB to select the muting pattern that best suites the needs of the eNB. While this technique provides maximum flexibility and is viable when a limited number of interferers are present, the technique may present node coordination issues when the number of interferers grows.

If, for example, a node in need of synchronization, called Node S, identifies the best synchronization source in its neighborhood and has three interfering cells, Cell 1, Cell 2 and Cell 3, the Node S, according to the methods discussed above, will request muting patterns activation to Cell 1, Cell 2 and Cell 3. However, Cell 1, Cell 2 and Cell 3, having full flexibility on the muting patterns to select, may end up with muting patterns that are not fully overlapping, leaving Node S with the problem of interference on some or all of the subframes that were supposed to be interference free.

Techniques are needed to let the interfering nodes understand on which resources they need to mute in a way that all interferers mute the same resources. This approach allows the node in need of synchronization to decode the synchronization reference signal in an interference free environment.

An assumption in the following detailed discussion of techniques for letting the interfering nodes know which resources need to be muted is that an interfering node is informed of the reference signal patterns used for over the air synchronization to be used by neighbor nodes. This information can be provided to the interfering node (or, indeed, to all nodes in the radio access network) by means of configuration via OAM. As noted above, this information may consist of setting up RS patterns on a per stratum basis. Namely, all cells supporting the same stratum level may use the same pattern of RS used for over the air synchronization.

Given the assumption above, an indication of the synchronization source identified by the node in need of synchronization may be included in the message that is sent to activate muting patterns. With this information, the interfering node is able to determine which pattern of resources should be interference protected to ensure that the RS sent by the source of synchronization node can be decoded in an interference limited environment.

Figure 11:
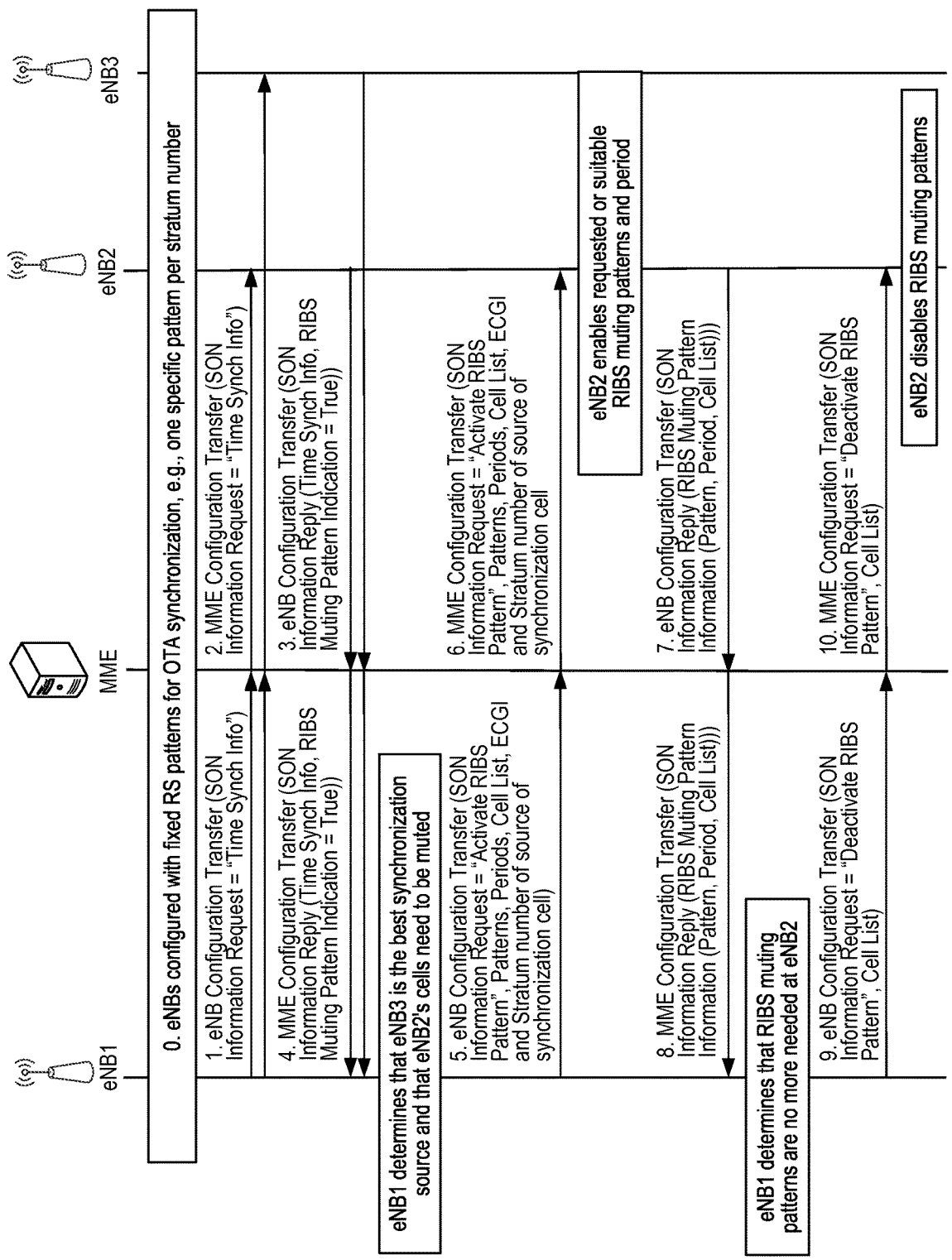
FIG. 11 is another signal flow diagram, again illustrating some embodiments of the presently disclosed techniques.

This approach enables interfering nodes to reduce utilization of resources and selectively mute resources in a way so as to ensure that the pattern of RS sent by the source of synchronization signal is partially or totally protected from interference, while also ensuring that all nodes interfering with the node in need of synchronization are aligned regarding the pattern of time/frequency resources to be protected from interference and therefore maximizing the level of interference protection over resources where the source of synchronisation signal transmits the RS used for over-the-air synchronization FIG. 11 illustrates an example of a signaling procedure to enable/disable muting patterns, according to this revised approach. The example is tailored to the LTE system, but may be adapted for other systems and networks. It will be appreciated that the signaling procedure shown in FIG. 11 is a revised version of the procedure shown in FIG. 9. In the example, a node in need of synchronization identifies the best cell providing synchronization signals and attempts to synchronize with it by requesting neighbor interfering nodes to reduce interference, namely to activate muting patterns.

FIG. 11 can be described as follows:

0) All eNBs in a neighborhood are configured with information on reference signals (RSs) patterns that are used for over the air (OTA) synchronization. One possible configuration of such signals is to associate a different RS pattern to each stratum level, i.e., all cells with the same stratum level would use the same RS pattern.

1-2) An eNB1 in need of synchronization detects one or more cells from eNB2 and eNB3 and sends an eNB Configuration Transfer message with SON Information Request IE set to "Time Synchronisation Info" to eNB2 and eNB3. The SON Information Request IE will be transparently forwarded as part of an MME Configuration Transfer to the target eNB2 and eNB3.

3-4) eNB 2 and eNB3 respond with an eNB Configuration Transfer message containing the SON Information Reply IE. This IE contains information such as the Time Synchronisation Information IE and in addition it contains a new optional flag stating whether RIBS muting patterns are available for activation or not (for example, the muting patterns may not be available because they are not supported in the receiving eNB or because traffic conditions are such that no muting can be supported). The information will be forwarded to eNB1 in MME Configuration Transfer messages. This message and information were described in the '398 application.

5-6) eNB1 evaluates which RS signals among the cells of eNB2 and eNB3 are the best available. Such evaluation may be done on the basis of parameters such as signal strength, eNB stratum level, synchronization status. Assuming that one of eNB3's cells is the best synchronization source, eNB1 determines that for correct detection of RS from eNB3, RS signals from eNB2 need to be muted. Therefore, eNB1 sends an eNB Configuration Transfer message towards eNB2 with a new IE for activation of muting patterns, e.g. and IE with value set to "Activate RIBS Pattern". In addition to the information discussed in connection with FIG. 9, in the procedure shown in FIG. 11 the message contains a new piece of information that informs the interfering node of the ECGI and/or stratum level of the cell selected by eNB1 as the best source of synchronization signal, namely Cell 3 in this example. Note that this information may be contained in a new IE, e.g., as part of the eNB/MME Configuration Transfer message.

6a) With the information received in message 6, eNB2 can either understand the stratum level of the source of synchronization cell, Cell 3, e.g., due to the explicit presence of a stratum number, or the eNB2 can know the ECGI of Cell 3 and therefore retrieve information about this cell either by means of previously stored neighbor information or by means of activation of an S1 procedure enabling reception of the Time Synchronisation Information IE including stratum level of Cell 3 (as shown in the optional step 6a).

The information that eNB2 should retrieve is such information that allows understanding of the synchronization RS pattern used by Cell 3. In the event that the synchronization RS pattern is unambiguously associated with the stratum level of the cell, such information is simply the Stratum level.

7-8) eNB2, namely the interfering eNB, selects the pattern and pattern periodicity that best suits its conditions such as traffic load and enables such pattern for the cells indicated by eNB1.

eNB2 may take into account information concerning the source of synchronization signal cell and its RS pattern for OTA synchronization when selecting its muting patterns. For example, if RS patterns are configured per stratum level and eNB2 acquired the stratum level of cell3, then eNB2 may select muting patterns that match in part or in full the pattern of RS for OTA synchronization transmitted by Cell 3.

eNB2 responds with an eNB Configuration Transfer message towards eNB1, where the SON Information Reply IE contains RIBS muting patterns characteristics and list of cells for which the patterns have been enabled.

9-10) At a later point in time, it may occur that muting from eNB2's cells is no longer needed. For example, eNB1 may not need the RS of eNB3 as source of synchronization or indeed it may occur that eNB3's signals become unavailable. In this case, eNB1 may request deactivation of the muting patterns via an eNB Configuration Transfer message towards eNB2 where the SON Information Request IE or another new or existing IE has been set to a new value such as "Deactivate RIBS Pattern". Optionally, a list of cells for which deactivation has to occur can be specified.

In the procedure illustrated in FIG. 11, one key thing to be highlighted is the addition of information concerning the source of synchronization cell in the message used for requesting activation of muting patterns. This information may be represented in the form of Stratum Level, ECGI or any other piece of information that may allow the interfering node to understand the pattern of RS for OTA synchronization used by the source of synchronization cell.

In view of the discussion presented above, it will be appreciated that the process flow diagrams of FIGS. 12-15 illustrate examples of methods carried out in accordance with the presently disclosed techniques.

Figure 12:
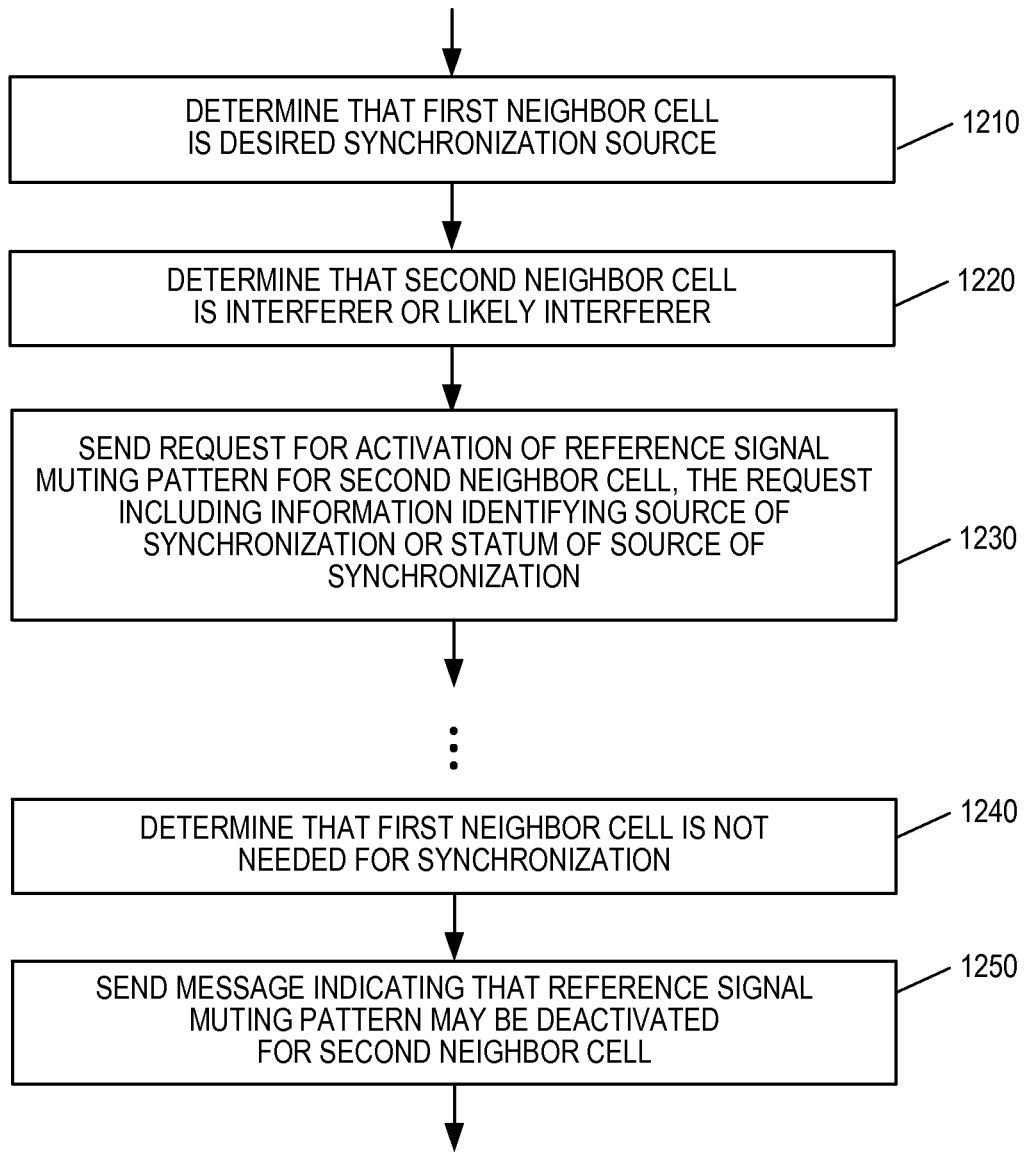
FIG. 12 is a process flow diagram illustrating an example method according to some of the disclosed techniques.

FIG. 12, for example, illustrates a method in a base station operating in a wireless communications network, for facilitating over-the-air synchronization with a neighboring base station. As shown at block 1210, the method includes determining that a first neighbor cell of a plurality of neighbor cells is a desired synchronization source. The method further includes determining that a second neighbor cell of the plurality of neighbor cells is interfering with or is likely to interfere with a signal, from the first neighbor cell, that is used for synchronization, as shown at block 1220. In response, as shown at block 1230, a request for activation of a reference signal muting pattern by the second neighbor cell is sent towards the second base station. The request includes information indicating the source of synchronization or the stratum of the source of synchronization. In some embodiments, the request for activation is sent to a controlling node in the wireless communications network, where the controlling node controls a base station corresponding to the second cell. In other embodiments, the request for activation is sent directly to the base station corresponding to the second cell.

As shown at blocks 1240 and 1250, the method further includes subsequently determining that the signal from the first neighbor cell is not needed or is unavailable for synchronization and, in response, sending a message, towards the second neighbor cell, indicating that the reference signal muting pattern may be deactivated.

In some embodiments of the illustrated method, determining that the first neighbor cell is a desired synchronization source comprises receiving synchronization information from at least the first neighbor cell, the synchronization information indicating at least one of a stratum level and synchronization status, and evaluating the received synchronization information. In some embodiments, determining that the first neighbor cell is a desired synchronization source is based at least in part on a signal strength of a signal received from the first neighbor cell.

Some embodiments further comprise receiving an indication of whether a reference signal muting pattern is available for the second neighbor cell. In these embodiments, sending the request for activation of the reference signal muting pattern is responsive to receiving said indication. The indication may comprise or be associated with an identification of one or more muting patterns available for the second neighbor cell, in some embodiments. In these and in other embodiments, the request for activation of the reference signal muting pattern includes a list of cells for which a muting pattern should be applied, and/or includes an identification of one or more resources that should be muted. This identification of resources may comprise a subframe pattern, or a pattern periodicity, or both.

Although not shown in FIG. 12, synchronization can be performed based on the signal from the first neighbor cell. In some embodiments, this may be based on receiving information identifying which resources are being muted or are to be muted by the second neighbor cell.

Figure 13:
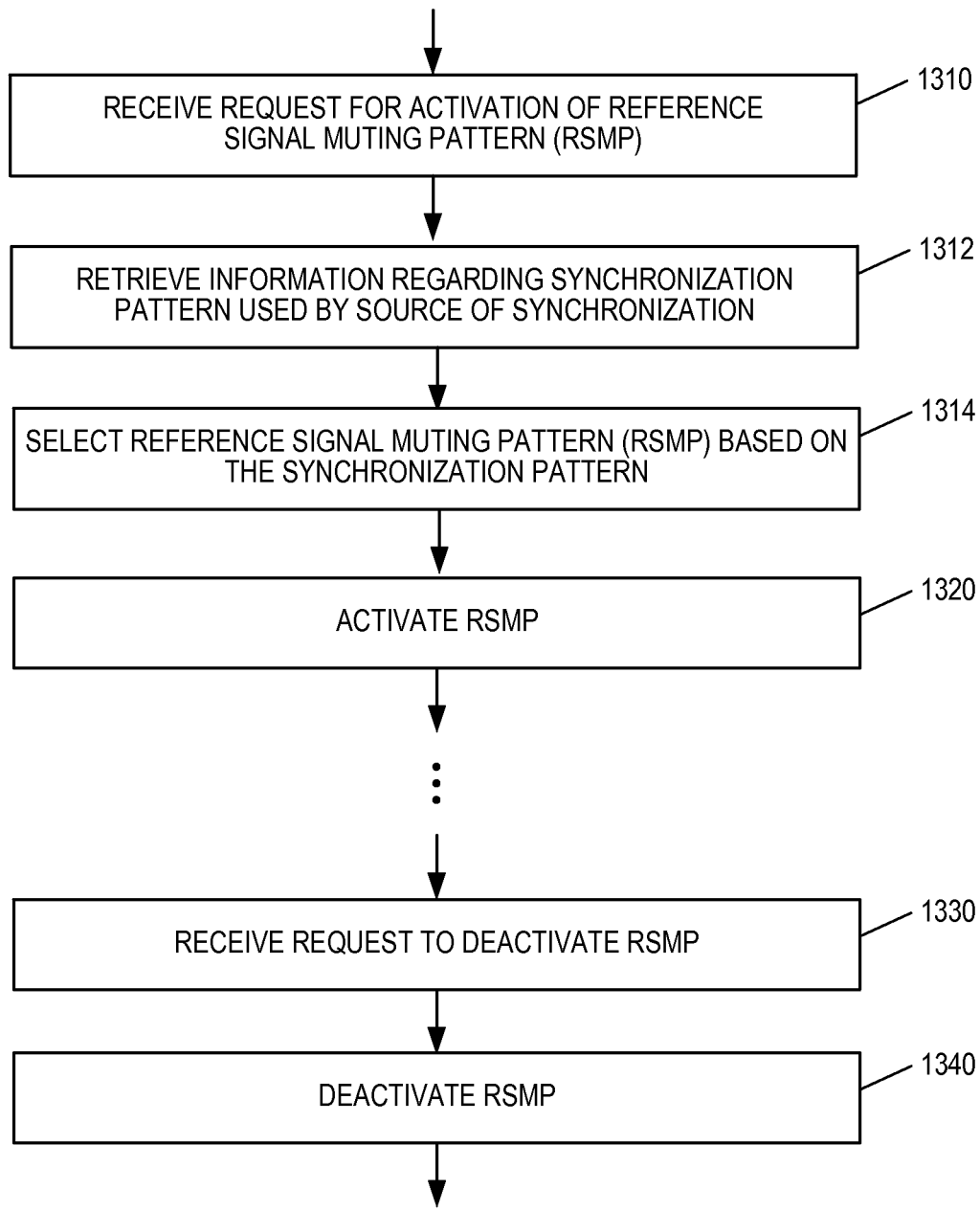
FIG. 13 is another process flow diagram illustrating an example method according to some of the disclosed techniques.

FIG. 13 illustrates a related method, in a base station operating in a wireless communications network, for facilitating over-the-air synchronization by a neighboring base station. As shown at block 1310, the illustrated method includes receiving a request for activation of a reference signal muting pattern for a cell supported by the base station. The request includes information identifying a source of synchronization for the neighboring base station or a stratum of the source of synchronization for the neighboring base station. In some embodiments the request for activation is received from another base station via a base station-to-base station interface. In others, the request for activation is received from a controlling node in the wireless communications network.

As shown at block 1312, the method further includes retrieving information regarding a synchronization pattern used by the source of synchronization for the neighboring base station. This may comprise retrieving previously stored neighbor cell information, or activating a procedure enabling reception of time synchronization information for the source of synchronization, or a combination of both, for example. A reference signal muting pattern is selected, as shown at block 1314, based on the synchronization pattern used by the source of synchronization for the neighboring base station. As shown at block 1320, the reference signal muting pattern is activated in response to the request.

In some embodiments, the information identifying a source of synchronization for the neighboring base station or a stratum of the source of synchronization for the neighboring base station identifies the stratum of the source of synchronization. In some of these embodiments, selecting a reference signal muting pattern based on the synchronization pattern used by the source of synchronization for the neighboring base station may comprise selecting a muting pattern that matches in full the pattern of reference symbols for synchronization transmitted by the source of synchronization.

In some instances, as shown at blocks 1330 and 1340, a request to deactivate the reference signal muting pattern may be subsequently received, and the reference signal muting pattern is deactivated, in response.

Although not shown in FIG. 13, the illustrated operations may be preceded, in some embodiments, by the receiving of a request for synchronization information and responding with synchronization information that includes at least an indication that one or more reference signal muting patterns is/are available. The synchronization information may include an identification of one or more resources that are muted in at least a first reference signal muting pattern; this identification may comprise a subframe pattern, or a pattern periodicity, or both.

In some cases, the receiving of the message 1310 may trigger the receiving node to request activation of a reference signal muting pattern by one or more additional base stations and/or for one or more additional cells. Thus, in some embodiments, the method shown in FIG. 13 is extended by the sending of a message requesting activation of a reference signal muting pattern for a cell supported by a second base station. This message is sent to the second base station, in some embodiments, or to a control node in the wireless communications network, in some others. The second base station may be selected based on an evaluation of its synchronization stratum level, in some embodiments, and/or based on an evaluation of its potential for interfering with one or more cells supported by the neighbor base station.

Figure 14:
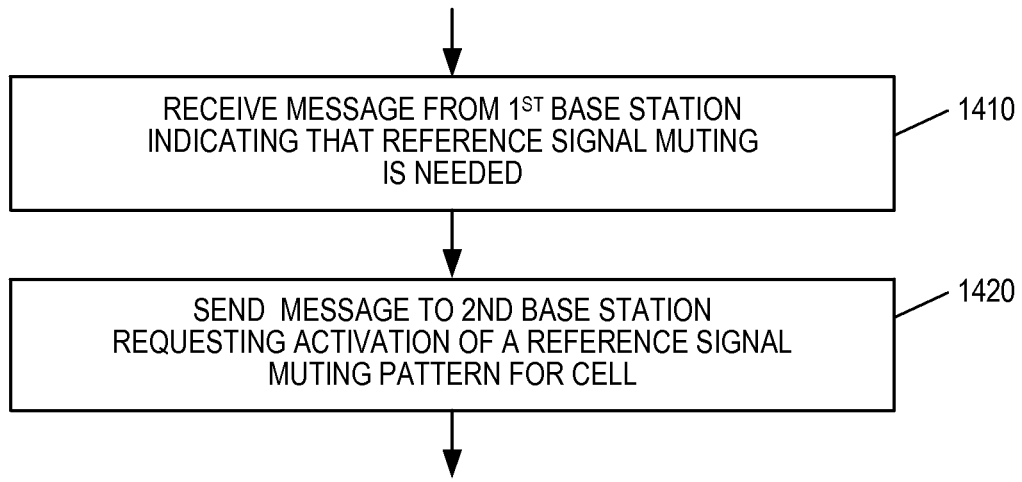
FIG. 14 is still another process flow diagram illustrating an example method according to some of the disclosed techniques.

FIG. 14 illustrates a method, implemented in a control node operating in a wireless communications network, for facilitating over-the-air synchronization by a first base station with a first neighbor cell of a plurality of neighbor cells. As shown at block 1410, the method includes receiving a first message from the first base station, the first message indicating that reference signal muting by at least a second neighbor cell of the plurality of neighbor cells is needed. This message may include information identifying the synchronization source for the first base station or a stratum for the synchronization source. As shown at block 1420, the method continues the sending of a second message to at least a second base station corresponding to the second neighbor cell, the second message requesting activation of a reference signal muting pattern for the second neighbor cell.

In some embodiments, the first message does not identify the second neighbor cell and the method further comprises determining that a muting pattern should be activated for at least the second neighbor cell based on at least the identity of the requesting base station or its corresponding cell. In some of these embodiments, determining that a muting pattern should be activated for at least the second neighbor cell comprises determining that the second neighbor cell is an interferer to a cell corresponding to the requesting base station.

The illustrated method can be extended to facilitate the muting of reference signals for additional cells. Thus, in some embodiments, the method shown in FIG. 14 is extended by the sending of the second message or a corresponding message to at least a third base station corresponding to a third neighbor cell, such that the second message or corresponding message requests activation of a reference signal muting pattern for the third neighbor cell.

Figure 15:
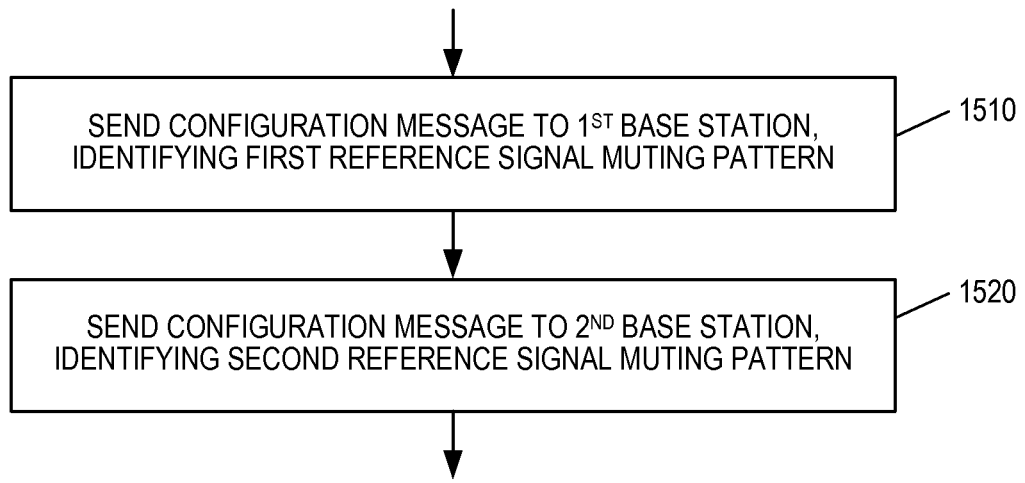
FIG. 15 is still another process flow diagram illustrating an example method according to some of the disclosed techniques.

FIG. 15 illustrates yet another example method, in this case implemented in a control node operating in a wireless communications network, for facilitating over-the-air synchronization between base stations controlled by the control node. As shown at block 1510, the method includes sending a first configuration message to a first base station, the configuration message identifying a first reference signal muting pattern for use in a first cell corresponding to the first base station. As shown at block 1520, a second configuration message is sent to a second base station, the second configuration message identifying a second reference signal muting pattern for use in a second cell corresponding to the second base station. The first and second reference signal muting patterns comprise one or more common muted resources. In some embodiments, the first and second reference signal muting patterns have identical sets of muted resources.

In some embodiments, the method comprises sending a configuration message to each of three or more base stations, each configuration message identifying a reference signal muting pattern, and the identified reference signal muting patterns for the three or more base stations all comprise one or more common muted resources. In some of these embodiments, the method comprises sending a configuration message to each of a first set of base stations and to each of a second set of base stations, each configuration message identifying a reference signal muting pattern, wherein the identified reference signal muting patterns for the first set of base stations have a first set of muted resources in common and wherein the identified reference signal muting patterns for the second set of base stations have a second set of muted resources in common, the first and second sets of muted resources being different. In some of these embodiments, the first set of base stations includes only base stations having a first synchronization stratum level and the second set of base stations includes only base stations having a second synchronization stratum level, the first and second synchronization stratum levels being different.

Figure 16:
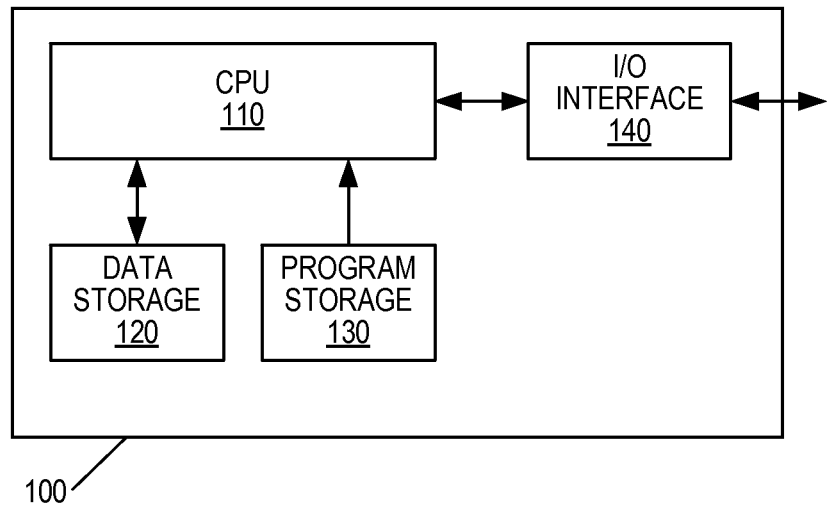
FIG. 16 illustrates components of an example base station or control node, according to various embodiments of the presently disclosed techniques and apparatus.

As discussed above, the several techniques described above may be implemented in a base station or other node, typically using a programmed processing node. FIG. 16 illustrates an example processing node 1, such as might be found in a base station or control node as discussed above. It will be appreciated that the processing circuit of FIG. 16, as detailed below, may correspond in whole or in part to the processing circuits illustrated in FIG. 7, for example.

A computer program for controlling the node 1 to carry out a method embodying any of the presently disclosed techniques is stored in a program storage 30, which comprises one or several memory devices. Data used during the performance of a method embodying the present invention is stored in a data storage 20, which also comprises one or more memory devices. During performance of a method embodying the present invention, program steps are fetched from the program storage 30 and executed by a Central Processing Unit (CPU) 10, retrieving data as required from the data storage 20. Output information resulting from performance of a method embodying the present invention, such as the estimated state information, can be stored back in the data storage 20, or sent to an Input/Output (I/O) interface 40, which may include a network interface for sending and receiving data to and from other network nodes.

The CPU 10 and its associated data storage 20 and program storage 20 may collectively be referred to as a "processing circuit." It will be appreciated that variations of this processing circuit are possible, including circuits include one or more of various types of programmable circuit elements, e.g., microprocessors, microcontrollers, digital signal processors, field-programmable application-specific integrated circuits, and the like, as well as processing circuits where all or part of the processing functionality described herein is performed using dedicated digital logic.

Accordingly, in various embodiments of the invention, processing circuits, such as the CPU 10, data storage 20, and program storage 30 in FIG. 16, are configured to carry out one or more of the techniques described in detail above. Of course, it will be appreciated that not all of the steps of these techniques are necessarily performed in a single microprocessor or even in a single module. It will also be appreciated that all of the details and variations discussed above in connection with the process flow diagrams of FIGS. 12-15 may apply to various embodiments of the circuits illustrated in FIG. 16.

Figure 17:
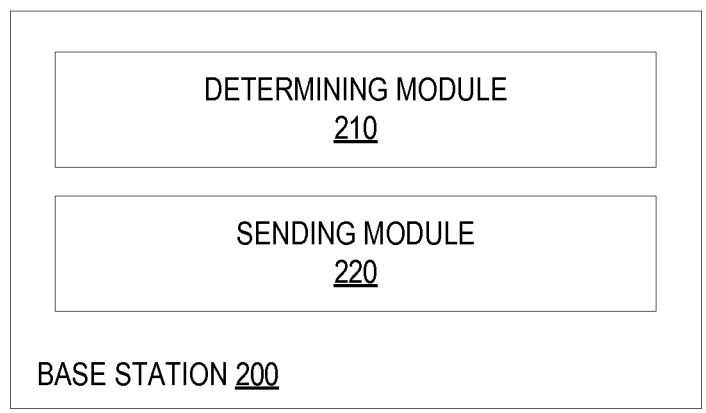
FIGS. 17, 18, and 19 are functional representations of example base stations and a control node, according to various embodiments of the presently disclosed techniques and apparatus.

It will further be appreciated that various aspects of the above-described above can be understood as being carried out by functional "modules," which may be program instructions executing on an appropriate processor circuit, hard-coded digital circuitry and/or analog circuitry, or appropriate combinations thereof. FIG. 17 illustrates an example base station 200, for example, which is configured for operation in a wireless communications network and to facilitate over-the-air synchronization with a neighboring base station. Base station 200, which may have a physical configuration like that of FIG. 7 and/or FIG. 16, includes a determining module 210 for determining that a first neighbor cell of a plurality of neighbor cells is interfering with or is likely to interfere with a signal, from a second neighbor cell, that is used for synchronization, and a sending module 220 for sending, towards the first neighbor cell, a request for activation of a reference signal muting pattern by the first neighbor cell, the request including information identifying the second neighbor cell or a stratum of the second neighbor cell. The several variations described above in connection with the process flow diagram of FIG. 12 are particularly applicable to base station 200, which may comprise further modules, such as an additional determining module for determining that the first neighbor cell is no longer needed for synchronization and an additional sending module for sending a message indicating that the reference signal muting pattern may be deactivated for the second neighbor cell.

Figure 18:
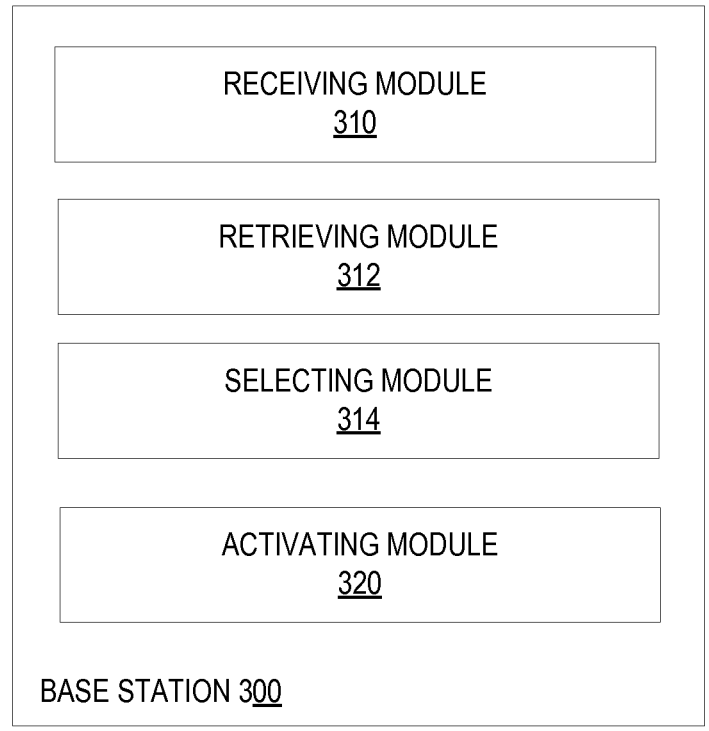

Similarly, FIG. 18 illustrates another representation of a base station 300, which is also configured for operation in a wireless communications network and to facilitate over-the-air synchronization among neighboring base stations. Base station includes a receiving module 310 for receiving a request for activation of a reference signal muting pattern for a cell supported by the base station, the request including information identifying a source of synchronization for the neighboring base station or a stratum of the source of synchronization for the neighboring base station. Base station 300 further includes a retrieving module 312 for retrieving information regarding a synchronization pattern used by the source of synchronization for the neighboring base station, and a selecting module 314 for selecting a reference signal muting pattern based on the synchronization pattern used by the source of synchronization for the neighboring base station. Base station 300 still further includes an activating module 320 for activating the reference signal muting pattern in response to the request. The several variations described above in connection with the process flow diagram of FIG. 13 are particularly applicable to base station 300, which may comprise further modules, such as an additional receiving module for receiving a request to deactivate the reference signal muting pattern and a deactivation module for deactivating the reference signal muting pattern, in response to the request.

Figure 19:
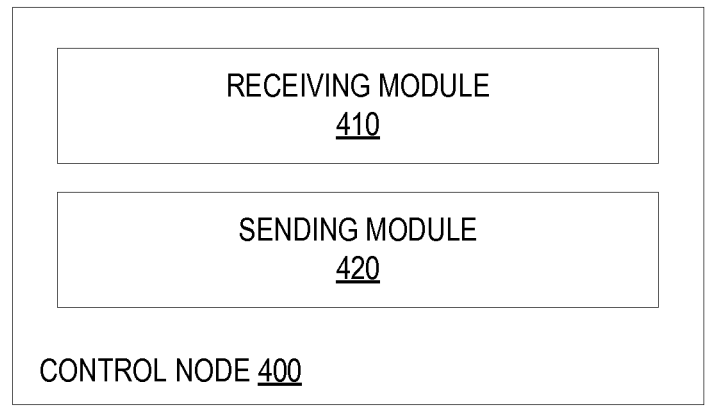

FIG. 19 illustrates a representation of a control node 400, which is also configured for operation in a wireless communications network and to facilitate over-the-air synchronization among neighboring base stations. Control node 400 comprises a receiving module 410 for receiving a first message from the first base station, the first message indicating that reference signal muting by at least a second neighbor cell of the plurality of neighbor cells is needed, the first message including information identifying a source of synchronization for the first base station or a stratum of the source of synchronization for the first base station. The control node 400 further includes a sending module 420 for sending a second message to at least a second base station, corresponding to the second neighbor cell, the second message requesting activation of a reference signal muting pattern for the second neighbor cell and including the information identifying a source of synchronization for the first base station or a stratum of the source of synchronization for the first base station. The several variations described above in connection with the process flow diagram of FIG. 14 are particularly applicable to control node 400.

Still further embodiments of the presently disclosed techniques and apparatus include computer program products comprising program instructions that, when executed by an appropriate processing circuit in a base station, control node, or the like, causes the node to carry out one or more of the methods described above. In some embodiments, any one or more of these computer program products may be embodied in a computer-readable medium, including a non-transitory medium such as a memory, recordable disc, or other storage device.

Examples of several embodiments of the present techniques have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The illustrative embodiments discussed more generally above are thus to be considered in all respects as illustrative and not restrictive.

What is claimed is:

1. A method, in a base station operating in a wireless communications network, for facilitating over-the-air synchronization with a neighboring base station, the method comprising:

determining that a first neighbor cell of a plurality of neighbor cells is interfering with or is likely to interfere with a signal, from a second neighbor cell, that is used for synchronization, wherein the second neighbor cell is a desired synchronization source for the base station; and sending, towards the first neighbor cell, a request for activation of a reference signal muting pattern by the first neighbor cell, the request including information identifying the second neighbor cell or a stratum of the second neighbor cell.

2. The method of claim 1, further comprising subsequently determining that the signal from the second neighbor cell is not needed or is unavailable for synchronization and, in response, sending a message, towards the first neighbor cell, indicating that the reference signal muting pattern may be deactivated.

3. The method of claim 1, wherein the request for activation is sent to a controlling node in the wireless communications network, wherein the controlling node controls a base station corresponding to the second cell.

4. The method of claim 1, wherein the request for activation is sent to a base station corresponding to the second cell.

5. The method of claim 1, further comprising determining that the second neighbor cell is a desired synchronization source, prior to determining that the first neighbor cell is interfering with or is likely to interfere with the signal from the second neighbor cell, by receiving synchronization information from at least the second neighbor cell, the synchronization information indicating at least one of a stratum level and synchronization status, and evaluating the received synchronization information.

6. The method of claim 1, further comprising determining that the second neighbor cell is a desired synchronization source, prior to determining that the first neighbor cell is interfering with or is likely to interfere with the signal from the second neighbor cell, based at least in part on a signal strength of a signal received from the second neighbor cell.

7. The method of claim 1, further comprising receiving an indication of whether a reference signal muting pattern is available for the first neighbor cell, wherein said sending of the request is responsive to receiving said indication.

8. The method of claim 7, wherein the indication comprises or is associated with an identification of one or more muting patterns available for the first neighbor cell.

9. The method of claim 1, wherein the request for activation of the reference signal muting pattern includes a list of cells for which a muting pattern should be applied.

10. The method of claim 1, further comprising performing synchronization based on the signal from the second neighbor cell.

11. The method of claim 1, further comprising receiving information identifying which resources are being muted or are to be muted by the first neighbor cell.

12. A method, in a base station operating in a wireless communications network, for facilitating over-the-air synchronization by a neighboring base station, the method comprising:
receiving a request for activation of a reference signal muting pattern for a cell supported by the base station, the request including information identifying a source of synchronization for the neighboring base station or a stratum of the source of synchronization for the neighboring base station;
retrieving information regarding a synchronization pattern used by the source of synchronization for the neighboring base station;
selecting a reference signal muting pattern based on the synchronization pattern used by the source of synchronization for the neighboring base station; and
activating the selected reference signal muting pattern in response to the request.

13. The method of claim 12, further comprising subsequently receiving a request to deactivate the reference signal muting pattern and, in response, deactivating the reference signal muting pattern.

14. The method of claim 12, further comprising first receiving a request for synchronization information and responding with synchronization information that includes at least an indication that one or more reference signal muting patterns is/are available.

15. The method of claim 14, wherein the synchronization information comprises an identification of one or more resources that are muted in at least a first reference signal muting pattern.

16. The method of claim 15, wherein the identification of one or more resources that are muted comprises a subframe pattern, or a pattern periodicity, or both.

17. The method of claim 12, wherein the request for activation is received from another base station via a base station-to-base station interface.

18. The method of claim 12, wherein the request for activation is received from a controlling node in the wireless communications network.

19. The method of claim 12, further comprising sending a message requesting activation of a reference signal muting pattern for a cell supported by a second base station.

20. The method of claim 19, wherein the message is sent to the second base station.

21. The method of claim 19, wherein the message is sent to a control node in the wireless communications network.

22. The method of claim 19, further comprising selecting the second base station based on an evaluation of its synchronization stratum level.

23. The method of claim 19, further comprising selecting the second base station based on an evaluation of its potential for interfering with one or more cells supported by the neighbor base station.

24. The method of claim 12, wherein retrieving information regarding a synchronization pattern used by the source of synchronization for the neighboring base station comprises retrieving previously stored neighbor cell information.

25. The method of claim 12, wherein retrieving information regarding a synchronization pattern used by the source of synchronization for the neighboring base station comprises activating a procedure enabling reception of time synchronization information for the source of synchronization.

26. The method of claim 12, wherein the information identifying a source of synchronization for the neighboring base station or a stratum of the source of synchronization for the neighboring base station identifies the stratum of the source of synchronization and wherein selecting a reference signal muting pattern based on the synchronization pattern used by the source of synchronization for the neighboring base station comprises selecting a muting pattern that matches in full the pattern of reference symbols for synchronization transmitted by the source of synchronization.

27. The method of claim 12, further comprising responding to the request for activation with a message indicating the activated reference signal muting pattern.

28. The method of claim 27, wherein the message indicating the activated reference signal muting pattern further identifies one or more cells for which the reference signal muting has been activated.

29. A base station apparatus comprising a transceiver circuit configured to communicate with one or more mobile stations and a communications interface circuit configured to communicate with one or more other base stations or with one or more control nodes, or one or more of each, the base station apparatus further comprising a processing circuit configured to control the transceiver circuit and the communications interface circuit and further configured to:

determine that a first neighbor cell of a plurality of neighbor cells is interfering with or is likely to interfere with a signal, from a second neighbor cell, that is used for synchronization, wherein the second neighbor cell is a desired synchronization source for the base station; and send, towards the first neighbor cell, a request for activation of a reference signal muting pattern by the first neighbor cell, the request including information identifying the second neighbor cell or a stratum of the second neighbor cell.

30. A base station apparatus comprising a transceiver circuit configured to communicate with one or more mobile stations and a communications interface circuit configured to communicate with one or more other base stations or with one or more control nodes, or one or more of each, the base station apparatus further comprising a processing circuit configured to control the transceiver circuit and the communications interface circuit and further configured to:

receive a request for activation of a reference signal muting pattern for a cell supported by the base station, the request including information identifying a source of synchronization for a neighboring base station or a stratum of the source of synchronization for the neighboring base station;

retrieve information regarding a synchronization pattern used by the source of synchronization for the neighboring base station;

select a reference signal muting pattern based on the synchronization pattern used by the source of synchronization for the neighboring base station; and activate the selected reference signal muting pattern in response to the request.

\* \* \* \* \*